US012174162B2

(12) United States Patent
Tanigawa et al.

(10) Patent No.: US 12,174,162 B2
(45) Date of Patent: Dec. 24, 2024

(54) HAZARDOUS SUBSTANCE ANALYZING SYSTEM

(71) Applicant: SHIMADZU CORPORATION, Kyoto (JP)

(72) Inventors: Tetsuo Tanigawa, Kyoto (JP); Natsuyo Asano, Kyoto (JP); Zhao Qi Zhan, Singapore (SG); Yin Ling Chew, Singapore (SG); Jun Xiang Lee, Singapore (SG); Jie Xing, Singapore (SG)

(73) Assignee: SHIMADZU CORPORATION, Kyoto (JP)

( * ) Notice: Subject to any disclaimer, the term of this patent is extended or adjusted under 35 U.S.C. 154(b) by 443 days.

(21) Appl. No.: 17/295,643

(22) PCT Filed: Oct. 30, 2019

(86) PCT No.: PCT/JP2019/042672
§ 371 (c)(1),
(2) Date: May 20, 2021

(87) PCT Pub. No.: WO2020/110583
PCT Pub. Date: Jun. 4, 2020

(65) Prior Publication Data
US 2022/0003727 A1    Jan. 6, 2022

(30) Foreign Application Priority Data

Nov. 29, 2018   (SG) .............................. 10201810706P

(51) Int. Cl.
*G01N 30/72*    (2006.01)
*G01N 30/02*    (2006.01)
(Continued)

(52) U.S. Cl.
CPC ......... *G01N 30/7266* (2013.01); *G01N 30/86* (2013.01); *G01N 30/88* (2013.01); *H01J 49/42* (2013.01); *G01N 2030/027* (2013.01)

(58) Field of Classification Search
CPC ......... G01N 2030/027; G01N 30/7266; G01N 30/86; G01N 30/88; G01N 2030/884;
(Continued)

(56) References Cited

U.S. PATENT DOCUMENTS

2016/0209378 A1*   7/2016   Kobayashi .......... H01J 49/4225

FOREIGN PATENT DOCUMENTS

CN      102788852 A   *  11/2012
CN      104330510 A   *   2/2015
(Continued)

OTHER PUBLICATIONS

Patrick, Rapid liquid chromatography-tandem mass spectrometry-based method for the analysis of alcohol ethoxylates and alkylphenol ethoxylates in environmental samples, 2013 (Year: 2013).*
(Continued)

*Primary Examiner* — John E Breene
*Assistant Examiner* — Truong D Phan
(74) *Attorney, Agent, or Firm* — Sughrue Mion, PLLC

(57) ABSTRACT

The following six methods included in a method package for hazardous substances in fiber products is stored beforehand in a method storage section (26): simultaneous analysis method for specific aromatic amines, simultaneous analysis method for the first group of azo dyes, simultaneous analysis method for the second group of azo dyes, simultaneous analysis method for PFCs, simultaneous analysis method for AP, and simultaneous analysis method for APEO. Each analysis method includes analysis conditions and parameters which are suitable for a simultaneous analysis of a specific category of hazardous substances, e.g. azo dyes. An analysis
(Continued)

condition setter (25) lists the six analysis methods on a display unit (28), from which an operator selects one analysis method to be executed. The operator also prepares mobile phases and a column specified for each analysis method. An LC controller (23) and an MS controller (24) control each relevant section of the system according to the analysis conditions and parameters described in the selected analysis method, to analyze a sample prepared from a fiber product. By this analysis, a test for major hazardous substances in the fiber product can be performed. A test for a specific hazardous substance which the operator desires to detect can also be easily and efficiently performed.

6 Claims, 22 Drawing Sheets

(51) Int. Cl.
*G01N 30/86* (2006.01)
*G01N 30/88* (2006.01)
*H01J 49/42* (2006.01)

(58) Field of Classification Search
CPC .... G01N 30/34; G01N 30/72; G01N 30/7206; G01N 30/7233; H01J 49/42; H01J 49/26
See application file for complete search history.

(56) References Cited

FOREIGN PATENT DOCUMENTS

CN 105588903 A * 5/2016
WO WO-2012035412 A2 * 3/2012 ......... G01N 30/7233

OTHER PUBLICATIONS

Oeko-Tex, "What is Standard 100 by OEKO-TEX?", [online], [accessed on Oct. 15, 2018], the Internet, 2021, pp. 1-4.

Gerd Vanhoenacker, et al., "Developing a method for the analysis of Azo Dyes using the Agilent 1290 Infinity LC Method Development System and the Agilent Method Scouting Wizard software", [online], [accessed on Oct. 15, 2018], the Internet, pp. 1-8.

Rebecca Stevens, et al., "Excellent Resolution of EU-Regulated Azo Dye Aryl Amines by GC-MS on the Rxi-e5Sil MS GC Column", [online], [accessed on Oct. 18, 2018], the Internet, pp. 1-9.

International Search Report for PCT/JP2019/042672 dated Dec. 10, 2019.

Written Opinion for PCT/JP2019/042672 dated Dec. 10, 2019.

* cited by examiner

Fig. 3

Aromatic amine compounds

| No | Compound name | Molecular formula | CAS No. | Exact mass |
|----|---------------|-------------------|---------|------------|
| 1  | 2,4'-Diaminoanisole | C7H10N2O | 615-05-4 | 138.0793 |
| 2  | 2,6'-Xylidine | C8H11N | 87-62-7 | 121.0891 |
| 3  | 2-Naphthylamine | C10H9N | 91-59-8 | 143.0735 |
| 4  | 3,3'-Dichlorobenzideine | C12H10Cl2N2 | 91-94-1 | 252.0221 |
| 5  | 4,4'-Thiodianiline | C12H12N2S | 139-65-1 | 216.0721 |
| 6  | 4-Aminoazobenzene | C12H11N3 | 60-09-3 | 197.0953 |
| 7  | 4-Aminobiphenyl | C12H11N | 92-67-1 | 169.0891 |
| 8  | 4-Chloro-o-toluidine | C7H8ClN | 95-69-2 | 141.0345 |
| 9  | 4,4'-Methylene-bis-2-chloroaniline | C13H12N2Cl2 | 101-14-4 | 266.0377 |
| 10 | 2,4'-Toluenediamine | C7H10N2 | 95-80-7 | 122.0844 |
| 11 | 2,4-Xylidine | C8H11N | 95-68-1 | 121.0891 |
| 12 | 4,4'-Methylene-o-toluidine | C15H18N2 | 838-88-0 | 226.1470 |
| 13 | Benzidine | C12H12N2 | 92-87-5 | 184.1000 |
| 14 | 4-Chloroaniline | C6H6ClN | 106-47-8 | 127.0189 |
| 15 | 3,3'-Dimethoxybenzidine | C14H16N2O2 | 119-90-4 | 244.1212 |
| 16 | o-Aminoazotoluene | C14H15N3 | 97-56-3 | 225.1266 |
| 17 | 2,4,5-Trimethylaniline | C9H13N | 137-17-7 | 135.1048 |
| 18 | 4,4'-Oxydianiline | C12H12N2O | 101-80-4 | 200.0949 |
| 19 | 4,4'-Diaminodiphenylmethane | C13H14N2 | 101-77-9 | 198.1157 |
| 20 | o-Anisidine | C7H9O1N | 90-04-0 | 123.0684 |
| 21 | o-Toluidine | C7H9N | 95-53-4 | 107.0735 |
| 22 | p-Cresidine | C8H11O1N | 120-71-8 | 137.0840 |
| 23 | o-Tolisine | C14H16N2 | 119-93-7 | 212.1313 |
| 24 | 5-Nitro-o-toluidine | C7H8N2O2 | 99-55-8 | 152.0586 |

Fig. 4

Dye compounds Group 1 (1/2)

| No | Dye name | Molecular formula | CAS No. | Exact mass |
|---|---|---|---|---|
| 1 | Basic Red 9 | C19H17N3 | 569-61-9 | 287.1422 |
| 2 | Disperse Blue 1 | C14H12N4O2 | 2475-45-8 | 268.096 |
| 3 | Basic Violet 14 | C20H20ClN3 | 632-99-5 | 337.1346 |
| 4 | Disperse Blue 7 | C18H18N2O6 | 3179-90-6 | 358.1165 |
| 5 | Disperse Blue 3 | C17H16N2O3 | 2475-46-9 | 296.1161 |
| 6 | Disperse Red 11 | C15H12N2O3 | 2872-48-2 | 268.0848 |
| 7 | Disperse Blue 102 | C15H19N5O45 | 12222-97-8 | 365.1158 |
| 8 | Disperse Red 17 | C17H20N4O4 | 3179-89-3 | 344.1484 |
| 9 | Disperse Yellow 39 | C17H16N2O | 12236-29-2 | 264.1263 |
| 10 | Disperse Blue 106 | C14H17N5O35 | 12223-01-7 | 335.1052 |
| 11 | Solvent Yellow 1 | C12H11N3 | 60-09-3 | 197.0953 |
| 12 | Disperse Orange 3 | C12H10N4O2 | 730-4-5 | 242.0804 |
| 13 | Disperse Yellow 3 | C15H15N2O2 | 2832-40-8 | 255.1133 |
| 14 | Disperse Brown 1 | C16H15Cl3N4O4 | 23355-64-8 | 432.0158 |
| 15 | Disperse Orange 11 | C15H11NO2 | 82-28-0 | 237.0790 |
| 16 | Bsic Green 4 | C23H25ClN2 | 569-64-2 | 364.1706 |
| 17 | Disperse Red 1 | C16H18N4O3 | 2872-52-8 | 314.1379 |
| 18 | Disperse Blue 35 | C20H14N2O5 | 12222-75-2 | 362.0902 |
| 19 | Disperse Yellow 49 | C22H22N4O2 | 54824-37-2 | 374.1742 |
| 20 | Basic Violet 1 | C24H28ClN3 | 8004-87-3 | 393.1972 |
| 21 | Solvent Yellow 3 | C14H15N3 | 97-56-3 | 225.1266 |
| 22 | Disperse Blue 124 | C16H19N5O45 | 61951-51-7 | 377.1158 |

Fig. 5

Dye compounds Group 1 (2/2)

| No | Dye name | Molecular formula | CAS No. | Exact mass |
|---|---|---|---|---|
| 23 | Basic Violet 3 | C25H30N3Cl | 548-62-9 | 407.2128 |
| 24 | Solvent Yellow 2 | C14H15N3 | 60-11-7 | 225.1266 |
| 25 | Disperse Orange 37/76 | C17H15Cl2N2O5 | 13301-61-6 | 397.0358 |
| 26 | Michler7s Base | C17H22N2 | 30135-64-9 | 254.1783 |
| 27 | Disperse Blue 26 | C16H14N2O4 | 3860-63-7 | 298.0953 |
| 28 | Disperse Orange 61 | C17H15Br2N5O2 | 12270-45-0 | 478.9592 |
| 29 | Disperse Yellow 56 | C21H15N5O2 | 54077-16-6 | 369.1225 |
| 30 | Disperse Orange 1 | C18H14N4O2 | 2581-69-3 | 318.1116 |
| 31 | Disperse Yellow 23 | C18H14N4O | 6250-23-3 | 302.1167 |
| 32 | Basic Blue 26 | C33H32ClN3 | 2580-56-5 | 505.2285 |
| 33 | Sudan Dye I | C16H12ON5 | 842-07-9 | 248.0949 |
| 34 | Disperse Red 151 | C27H25N5O5S | 70210-08-1 | 531.1576 |
| 35 | Sudan Dye II | C18H16N2O | 3118-97-6 | 276.1263 |
| 36 | Sudan Dye III | C22H16N4O | 85-86-9 | 352.1324 |
| 37 | Sudan Dye IV | C24H20N4O | 85-83-6 | 380.1637 |
| 38 | Acid Orange 7 | C16H11N2NaO4S | 633-96-5 | 350.0337 |
| 39 | Acid Yellow 36 | C18H15N3NaO3S | 587-98-4 | 376.0732 |
| 40 | Acid Violet 49 | C39H40N3NaO6S2 | 1694-09-3 | 733.87 |
| 41 | Disperse Yellow 1 | C12H9N3O5 | 119-15-3 | 275.0542 |
| 42 | Disperse Yellow 9 | C12H10N4O4 | 6373-73-5 | 274.0702 |
| 43 | Disperse Yellow 7 | C19H16N4O | 6300-37-4 | 316.1324 |
| 44 | Disperse Orange 149 | C25H26N6O3 | 85136-74-9 | 458.2066 |

Fig. 6

Dye compounds Group2

| No | Dye name | Molecular formula | CAS No. | Exact mass |
|---|---|---|---|---|
| 1 | Acid Red 26 | C18H14N2Na2O7S2 | 3761-53-3 | 480.0038 |
| 2 | Acid Red 114 | C37H28N4Na2O10S3 | 6459-94-5 | 830.0763 |
| 3 | Direct Red 28 | C32H22N6Na2O6S2 | 57358-0 | 696.0838 |
| 4 | Direct Blue 6 | C32H20N6Na4O14S4 | 2602-46-2 | 931.9512 |
| 5 | Direct Black 38 | C34H25N9Na2O7S2 | 1937-37-7 | 781.1114 |
| 6 | Direct Brown 95 | C31H18CuN6O9S.2Na | 16071-86-6 | 759.0047 |
| 7 | Navy Blue 1 (Navy Blue 018112) | C39H23ClCrN7O12S.2Na | 118685-33-9 | 946.0014 |

Fig. 7

Perfluorocompounds (PFCs)

| No | Compound name | Abbreviation | Molecular formula | CAS No | Exact mass |
|---|---|---|---|---|---|
| 1 | Perfluorobutanoic acid | PFBA | C4HF7O2 | 375-22-4 | 213.99 |
| 2 | Perfluoro-n-pentanoic acid | PFPA | C5HF9O2 | 2706-90-3 | 263.98 |
| 3 | Perfluorohexanoic acid | PFHxA | C6HO2F11 | 307-24-4 | 313.98 |
| 4 | Perfluoro-n-heptanoic acid | PFHpA | C7HF13O2 | 375-85-9 | 363.98 |
| 5 | Perfluorooctane acid | PFOA | C8HF15O2 | 335-67-1 | 413.97 |
| 6 | Perfluoro-n-nonanoic acid | PFNA | C9HF17O2 | 375-95-1 | 463.97 |
| 7 | Perfluoro-n-decanoic acid | PFDA | C10HF17O2 | 335-76-2 | 513.97 |
| 8 | Perfluoro-3,7-dimethyloctanoic acid | PF-3,7-DMOA | C10HF19O2 | 172155-07-6 | 513.97 |
| 9 | Perfluoroundecanoic acid | PFUnA | C11HF21O2 | 2058-94-8 | 563.96 |
| 10 | Perfluoro-n-dodecanoic acid | PFDoA | C12HF23O2 | 307-55-1 | 613.96 |
| 11 | Perfluoro-n-tridecanoic acid | PFTrDA | C13HO2F25 | 72629-94-8 | 663.96 |
| 12 | Perfluoro-n-tetradecanoic acid | PFTeDA | C14HO2F27 | 376-06-7 | 713.95 |
| 13 | Perfluorooctanesulfonic acid | PFOS | C8F17O3HS | 1763-23-1 | 499.94 |
| 14 | Perfluorobutane solfonate | PFBS | C4F9SO3H | 375-73-5 | 299.95 |
| 15 | Perfluorohexane solfonate | PFHxS | C6F13HO3S | 355-46-4 | 399.94 |
| 16 | Perfluoroheptanesulfonic acid | PFHpS | C7HF15O3S | 375-92-8 | 449.94 |
| 17 | Sodium parfluoro-1-decanesulfonate | L-PFDS | C10HF21SO3 | 126105-34-8 | 599.93 |
| 18 | N-methylperfluoro-1-octansulfonamide | N-MeFOSA-M | C9H4F17NO2S | 31506-32-8 | 512.97 |
| 19 | N-ethylperfluoro-1-octansulfonamide | N-EtFOSA-M | C10H6F17NO2S | 4151-50-2 | 526.98 |
| 20 | Perfluorooctanesulfonamide | PFOSA | C8H2F17NO2S | 754-91-6 | 498.95 |
| 21 | 7H-Perfluoroheptanoic acid | HPFHpA | CHF2(CF2)5COOH | 1546-95-8 | 345.99 |
| 22 | 2H,2H-Perfluorodecanoic acid | H2PFDA/FOEA | CF3(CF2)7CH2COOH | 27854-31-5 | 477.99 |
| 23 | 2H,2H,3H,3H-Perfluoroundecanoic acid | H4PFUnA | CF3(CF2)7(CH2)2COOH | 34598-33-9 | 492.00 |
| 24 | 1H,1H,2H,2H-Perfluorooctanesulfonic acid | H4PFOS | C8H5F13O3S | 27619-97-2 | 427.98 |

Fig. 8

Alkylphenols (AP)

| No | Compound name | Abbreviation | Molecular formula | Exact mass |
|---|---|---|---|---|
| 1 | Nonylphenol | NP | C15H24O | 220.18 |
| 2 | 4-Nonylphenol | 4-n-NP | C15H24O | 220.18 |
| 3 | 4-n-Octylphenol | 4-n-OP | C14H22O | 206.17 |
| 4 | 4-tert-Octylphenol | 4-t-OP | C14H22O | 206.17 |

Fig. 9

Alkylphenol ethoxylates (APEO)

| No | Compound name | Abbreviation | Molecular formula | Exact mass |
|---|---|---|---|---|
| 1 | Nonylphenol Ethoxylate | NPEO | C15H24O(C2H4O)n (where n=3~17) | Varies |
| 2 | Octylphenol Ethoxylate | OPEO | C14H22O(C2H4O)n (where n=3~16) | Varies |

Fig. 10

Aromatic amine compounds

| No | Compound name | RT(min) | Quantifier MRM transion | Reference MRM transion |
|----|---------------|---------|-------------------------|------------------------|
| 1 | 2,4'-Diaminoanisole | 2.502 | 139.1>108 | 139.1>124.1 | 139.1>107.05 |
| 2 | 2,6'-Xylidine | 4.498 | 122.1>77.05 | 122.1>107.1 | 122.1>79.05 |
| 3 | 2-Naphthylamine | 5.543 | 144.1>127.05 | 144.1>76.95 | 144.1>51.05 |
| 4 | 3,3'-Dichlorobenzideine | 6.22 | 253.1>217 | 253.1>182 | 253.1>154 |
| 5 | 4,4'-Thiodianiline | 5.121 | 217.1>124 | 217.1>80 | 217.1>199.1 |
| 6 | 4-Aminoazobenzene | 6.353 | 198.1>77.1 | 198.1>51.1 | 198.1>105.1 |
| 7 | 4-Aminobiphenyl | 5.986 | 170.1>152.1 | 170.1>153.15 | 170.1>127.1 |
| 8 | 4-Chloro-o-toluidine | 5.833 | 142.1>107.15 | 142.1>106.15 | 142.1>89.1 |
| 9 | 4,4'-Methylene-bis-2-chloroaniline | 6.316 | 267.1>231.05 | 267.1>195.1 | 267.1>140 |
| 10 | 2,4-Toluenediamine | 2.627 | 123.1>108 | 123.1>77 | 123.1>106.05 |
| 11 | 2,4'-Xylidine | 5.567 | 122.1>77.1 | 122.1>79.05 | 122.1>107.1 |
| 12 | 4,4'-Methylene-o-toluidine | 4.609 | 227.2>120.05 | 227.2>76.95 | 227.2>178.1 |
| 13 | Benzidine | 3.758 | 185.1>167.15 | 185.1>168.2 | 185.1>139 |
| 14 | 4-Chloroaniline | 5.32 | 128.1>93.1 | 128.1>75.2 | 128.1>110.95 |
| 15 | 3,3'-Dimethoxybenzidine | 4.707 | 245.2>230.1 | 245.2>187.1 | 245.2>202.15 |
| 16 | o-Aminoazotoluene | 6.963 | 226.2>51 | 226.2>121.05 | 226.2>106 |
| 17 | 2,4,5-Trimethylaniline | 4.856 | 136.1>121.1 | 136.1>91.1 | 136.1>77 |
| 18 | 4,4'-Oxydianiline | 3.649 | 201.1>108.05 | 201.1>80.1 | 201.1>156.2 |
| 19 | 4,4'-Diaminodiphenylmethane | 3.769 | 199.2>106.05 | 199.2>77.05 | 199.2>79.05 |
| 20 | o-Anisidine | 4.068 | 124.1>109.05 | 124.1>80 | 124.1>65.05 |
| 21 | o-Toluidine | 4.758 | 108.1>91.05 | 108.1>65.1 | 108.1>93.05 |
| 22 | p-Cresidine | 4.85 | 138.1>123.05 | 138.1>122.05 | 138.1>77 |
| 23 | o-Tolidine | 4.758 | 213.1>180.05 | 213.1>198.15 | 213.1>152.15 |
| 24 | 5-Nitro-o-toluidine (NOT) | 5.344 | 153.15>136.15 | 153.1>106.15 | --- |

Fig. 11

Dye compounds Group 1 (1/2)

| No | Dye name | RT(min) | Quantifier MRM transition | Reference MRM transition |
|---|---|---|---|---|
| 1 | Basic Red 9 | 2.144 | 288.10>195.10 | 288.10>151.05 | 288.10>167.05 |
| 2 | Disperse Blue 1 | 2.163 | 269.10>161.05 | 269.10>107.00 | 269.10>135.05 |
| 3 | Basic Violet 14 | 2.714 | 302.20>209.05 | 302.20>195.10 | 302.20>286.15 |
| 4 | Disperse Blue 7 | 2.852 | 359.20>283.10 | 359.20>314.10 | 359.20>328.00 |
| 5 | Disperse Blue 3 | 3.743 | 297.10>252.10 | 297.10>235.05 | 297.10>251.10 |
| 6 | Disperse Red 11 | 3.832 | 269.10>226.05 | 269.10>254.05 | 269.10>169.05 |
| 7 | Disperse Blue 102 | 4.396 | 366.10>208.15 | 366.10>147.10 | 366.10>118.10 |
| 8 | Disperse Red 17 | 5.086 | 345.20>164.10 | 345.20>177.10 | 345.20>269.10 |
| 9 | Disperse Yellow 39 | 5.358 | 265.10>249.10 | 265.10>250.10 | 265.10>120.05 |
| 10 | Disperse Blue 106 | 5.495 | 336.10>178.15 | 336.10>118.05 | 336.10>147.10 |
| 11 | Solvent Yellow 1 | 5.58 | 198.10>77.10 | 198.10>55.10 | 198.10>105.10 |
| 12 | Disperse Orange 3 | 6.038 | 243.10>122.00 | 243.10>75.00 | 243.10>92.15 |
| 13 | Disperse Yellow 3 | 6.099 | 270.10>107.00 | 270.10>108.05 | 270.10>150.05 |
| 14 | Disperse Brown 1 | 6.214 | 433.00>153.05 | 433.00>197.10 | 433.00>357.00 |
| 15 | Disperse Orange 11 | 6.252 | 238.00>165.10 | 238.00>167.10 | 238.00>222.95 |
| 16 | Bsic Green 4 | 6.631 | 329.20>313.20 | 329.20>208.15 | 329.20>165.10 |
| 17 | Disperse Red 1 | 6.82 | 315.10>134.10 | 315.10>255.10 | 315.10>122.00 |
| 18 | Disperse Blue 35 | 7.353 | 285.10>270.05 | 285.10> | 41.90 |
| 19 | Disperse Yellow 49 | 7.516 | 375.20>238.15 | 375.20>208.15 | 375.20>210.10 |
| 20 | Basic Violet 1 | 7.531 | 358.30>342.25 | 358.30>326.10 | 358.30>343.25 |
| 21 | Solvent Yellow 3 | 7.584 | 226.30>91.05 | 226.30> | 21.05 |
| 22 | Disperse Blue 124 | 7.662 | 378.10>220.15 | 378.10>87.10 | 378.10>160.15 |

Fig. 12

Dye compounds Group 1 (2/2)

| No | Dye name | RT(min) | Quantifier MRM transition | Reference MRM transition |
|---|---|---|---|---|
| 23 | Basic Violet 3 | 8.527 | 372.30>235.15 | 372.30>356.25 | 372.30>340.20 |
| 24 | Solvent Yellow 2 | 8.961 | 226.20>77.05 | 226.20>120.10 | 226.20>92.10 |
| 25 | Disperse Orange 37/76 | 9.009 | 392.10>323.00 | 392.10>351.05 | 392.10>133.05 |
| 26 | Michler7's Base | 9.038 | 255.20>240.10 | 255.20>239.15 | 255.20>223.15 |
| 27 | Disperse Blue 26 | 9.14 | 299.10>284.05 | 299.10>266.00 | 299.10>267.00 |
| 28 | Disperse Orange 61 | 9.275 | 482.00>363.00 | 482.00>440.90 | 482.00>131.10 |
| 29 | Disperse Yellow 56 | 9.266 | 384.10>120.00 | 384.10>197.10 | 384.10>92.05 |
| 30 | Disperse Orange 1 | 9.713 | 319.10>169.10 | 319.10>122.00 | 319.10>181.05 |
| 31 | Disperse Yellow 23 | 9.82 | 303.10>77.05 | 303.10>104.95 | 303.10>181.15 |
| 32 | Basic Blue 26 | 9.843 | 470.30>454.20 | 470.30>349.20 | 470.30>333.10 |
| 33 | Sudan Dye I | 9.899 | 249.10>232.05 | 249.10>93.10 | 249.10>156.05 |
| 34 | Disperse Red 151 | 11.261 | 532.30>351.15 | 532.30>100.05 | 532.30>76.95 |
| 35 | Sudan Dye II | 12.115 | 277.10>121.10 | 277.10>106.05 | 277.10>156.05 |
| 36 | Sudan Dye III | 13.789 | 353.30>77.05 | 353.30>198.10 | 353.30>197.15 |
| 37 | Sudan Dye IV | 16.199 | 381.20>225.20 | 381.20>106.10 | 381.20>224.15 |
| 38 | Acid Orange 7 | 1.505 | 327.10>171.15 | 327.10>156.25 | |
| 39 | Acid Yellow 36 | 2.47 | 352.10>156.10 | 352.10>79.95 | |
| 40 | Acid Violet 49 | 2.641 | 710.30>170.10 | 710.30>524.40 | 710.30>260.45 |
| 41 | Disperse Yellow 1 | 4.647 | 274.20>244.05 | 274.20>226.10 | 274.20>166.10 |
| 42 | Disperse Yellow 9 | 4.749 | 273.10>242.15 | 273.10>226.20 | 273.10>213.10 |
| 43 | Disperse Yellow 7 | 10.74 | 315.10>210.15 | 315.10>106.10 | 315.10>181.15 |
| 44 | Disperse Orange 149 | 11.29 | 457.20>121.10 | 457.20>266.10 | 457.20>224.15 |

Fig. 13

Dye compounds Group2

| No | Dye name | RT(min) | Quantifier MRM transition | Reference MRM transition |
|---|---|---|---|---|
| 1 | Acid Red 26 (posi) | 3.079 | 437.00>121.10 | 437.00>355.15 437.00>105.95 |
| 2 | Acid Red 26 | 3.079 | 435.10>355.10 | 435.10>301.95 435.10>194.05 |
| 3 | Acid Red 114 | 4.413 | 785.10>302.00 | 785.10>222.05 785.10>238.00 |
| 3 | Direct Red 28 (posi) | 3.433 | 653.20>168.15 | 653.20>308.15 653.20>389.15 |
| 4 | Direct Red 28 | 3.434 | 325.20>152.15 | 325.20>81.05 325.20>416.20 |
| 4 | Direct Blue 6 | 2.67 | 421.20>249.00 | 421.20>185.10 421.20>250.00 |
| 5 | Direct Black 38 (posi) | 3.829 | 738.20>106.90 | 738.20>274.05 738.20>302.15 |
| 5 | Direct Black 38 | 3.842 | 736.20>672.05 | 736.20>357.10 736.20>643.95 |
| 6 | Direct Brown 95 | 3.536 | 356.80>186.00 | 356.80>274.90 356.80>314.00 |
| 7 | Navy Blue | 4.581 | 901.00>440.00 | 901.00>343.15 901.00>197.05 |

Fig. 14

| No | Compound abbreviation | RT (min) | Quantifier MRM transition | Reference MRM transition | |
|---|---|---|---|---|---|
| | Perfluorocompounds (PFCs) | | | | |
| 1 | PFBA | 2.00 | 212.90>169.05 | — | |
| 2 | PFPA | 3.02 | 262.90>219.05 | 262.90>219.05 | |
| 3 | PFHxA | 3.68 | 313.00>269.05 | 313.00>269.05 | |
| 4 | PFHpA | 4.20 | 362.90>319.10 | 362.90>169.10 | 362.90>119.05 |
| 5 | PFOA | 4.65 | 413.00>369.05 | 413.00>169.10 | 413.00>219.05 |
| 6 | PFNA | 5.04 | 463.00>419.00 | 463.00>219.10 | 463.00>169.10 |
| 7 | PFDA | 5.42 | 513.00>469.05 | 513.00>219.05 | 513.00>269.10 |
| 8 | PF-3,7-DMOA | 5.18 | 469.00>269.05 | 469.00>219.10 | 469.00>69.05 |
| 9 | PFUnA | 5.79 | 563.00>519.05 | 563.00>269.05 | 563.00>169.10 |
| 10 | PFDoA | 6.16 | 613.00>569.05 | 613.00>169.10 | 613.00>269.10 |
| 11 | PFTrDA | 6.51 | 663.00>619.00 | 663.00>169.10 | 663.00>219.10 |
| 12 | PFTeDA | 6.87 | 712.90>668.90 | 712.90>169.05 | 712.90>218.95 |
| 13 | PFOS | 5.58 | 499.00>98.90 | 499.00>79.95 | 499.00>230.00 |
| 14 | PFBS | 3.69 | 298.90>79.95 | 298.90>98.95 | 298.90>82.90 |
| 15 | PFHxS | 4.76 | 398.90>79.90 | 398.90>79.90 | 398.90>119.0 |
| 16 | PFHpS | 5.18 | 448.90>99.00 | 448.90>99.00 | 448.90>169.15 |
| 17 | L-PFDS | 6.33 | 599.00>79.95 | 599.00>99.00 | 599.00>130.00 |
| 18 | N-MeFOSA-M | 8.38 | 512.00>160.05 | 512.00>219.05 | 512.00>269.05 |
| 19 | N-EtFOSA-M | 8.71 | 526.00>169.05 | 526.00>219.05 | 526.00>269.05 |
| 20 | PFOSA | 7.05 | 498.00>77.95 | 498.00>169.00 | 498.00>477.85 |
| 21 | HPFHpA | 3.73 | 345.00>281.05 | 345.00>131.10 | 345.00>39.10 |
| 22 | H2PFDA/FOEA | 4.88 | 477.00>393.05 | 477.00>62.95 | 477.00>243.00 |
| 23 | H4PFUnA | 5.48 | 491.00>367.05 | 491.00>387.05 | 491.00>316.95 |
| 24 | H4PFOS | 4.47 | 427.00>407.00 | 427.00>80.95 | 427.00>80.05 |

Fig. 15

Alkylphenols (AP)

| No | Compound Abbreviation | RT(min) | Quantifier MRM transition | Reference MRM transition |
|---|---|---|---|---|
| 1 | NP | 4.60 | 219.2>133.1 | 219.2>117.0 |
| 2 | 4-n-NP | 5.51 | 219.2>105.6 | — |
| 3 | 4-n-OP | 3.80 | 205.2>133.1 | 205.2>116.9 |
| 4 | 4-t-OP | 4.83 | 205.2>106.0 | — |

Fig. 16

| No | Compound Name | RT (min) | Quantifier transition | Reference transition | |
|----|---------------|----------|----------------------|---------------------|---|
| 1  | NPEO (n=3)    | 2.636    | 370.30>227.10        | 370.30>121.10       |   |
| 2  | NPEO (n=4)    | 2.624    | 414.30>271.15        | 414.30>397.30       | 414.30>121.05 |
| 3  | NPEO (n=5)    | 2.615    | 458.30>441.35        | 458.30>315.20       | 458.30>121.10 |
| 4  | NPEO (n=6)    | 2.604    | 502.40>485.30        | 502.40>359.20       | 502.40>133.05 |
| 5  | NPEO (n=7)    | 2.584    | 546.40>529.35        | 546.40>133.05       | 546.40>89.10  |
| 6  | NPEO (n=8)    | 2.571    | 590.40>573.35        | 590.40>133.05       | 590.40>291.20 |
| 7  | NPEO (n=9)    | 2.551    | 634.50>133.10        | 634.50>617.40       | 634.50>89.10  |
| 8  | NPEO (n=10)   | 2.533    | 678.50>133.00        | 678.50>89.05        | 678.50>291.20 |
| 9  | NPEO (n=11)   | 2.515    | 722.50>133.05        | 722.50>89.00        | 722.50>291.20 |
| 10 | NPEO (n=12)   | 2.498    | 766.50>133.00        | 766.50>89.00        | 766.50>291.20 |
| 11 | NPEO (n=13)   | 2.48     | 810.60>133.05        | 810.60>89.00        | 810.60>291.20 |
| 12 | NPEO (n=14)   | 2.462    | 854.60>133.00        | 854.60>89.05        | 854.60>177.05 |
| 13 | NPEO (n=15)   | 2.448    | 898.60>133.05        | 898.60>89.00        | 898.60>177.20 |
| 14 | NPEO (n=16)   | 2.434    | 942.60>132.80        | 942.60>89.00        | 942.60>131.10 |
| 15 | NPEO (n=17)   | 2.418    | 986.70>89.00         | 986.70>133.10       |   |

Fig. 17

| No | Compound Name | RT (min) | Quantifier transition | Reference transition | |
|---|---|---|---|---|---|
| 16 | OPEO (n=3) | 2.372 | 356.30>226.70 | 356.30>120.80 | |
| 17 | OPEO (n=4) | 2.356 | 400.30>271.10 | 400.30>383.25 | 400.30>121.10 |
| 18 | OPEO (n=5) | 2.344 | 444.30>427.30 | 444.30>315.15 | 444.30>121.00 |
| 19 | OPEO (n=6) | 2.329 | 488.40>471.30 | 488.40>359.20 | 488.40>133.05 |
| 20 | OPEO (n=7) | 2.31 | 532.40>515.40 | 532.40>133.10 | 532.40>89.05 |
| 21 | OPEO (n=8) | 2.285 | 576.40>559.30 | 576.40>133.05 | 576.40>277.20 |
| 22 | OPEO (n=9) | 2.261 | 620.40>133.05 | 620.40>603.40 | 620.40>277.20 |
| 23 | OPEO (n=10) | 2.237 | 664.50>133.10 | 664.50>89.05 | 664.50>647.50 |
| 24 | OPEO (n=11) | 2.21 | 708.50>133.05 | 708.50>277.15 | 708.50>89.05 |
| 25 | OPEO (n=12) | 2.181 | 752.50>133.00 | 752.50>89.00 | 752.50>277.10 |
| 26 | OPEO (n=13) | 2.151 | 796.50>133.05 | 796.50>277.20 | 796.50>88.95 |
| 27 | OPEO (n=14) | 2.119 | 840.60>133.05 | 840.60>88.90 | 840.60>177.20 |
| 28 | OPEO (n=15) | 2.082 | 884.60>89.05 | 884.60>133.10 | 884.60>277.20 |
| 29 | OPEO (n=16) | 2.054 | 928.60>132.95 | 928.60>89.05 | 928.60>177.10 |

HAZARDOUS SUBSTANCE ANALYZING SYSTEM

CROSS REFERENCE TO RELATED APPLICATIONS

This application is a National Stage of International Application No. PCT/JP2019/042672 filed Oct. 30, 2019, claiming priority based on Singapore Patent Application No. 10201810706P filed Nov. 29, 2018.

TECHNICAL FIELD

The present invention relates to an analyzing system for quantitatively analyzing specific hazardous substances contained in a sample, as well as a computer program to be executed on a computer for such an analysis. More specifically, the present invention relates to an analyzing system and a computer program using a liquid chromatograph mass spectrometer as an analyzing device. The present invention is particularly suitable for a test for hazardous substances in various fiber products, including raw yarns, semi-finished textile products and finished textile products.

BACKGROUND ART

Various chemical substances are contained in clothes and other fiber products which are commonly worn in everyday life. Some of those substances are potentially hazardous to the human body and may cause health problems. In the present description, the term "hazardous substance" is used to refer to not only substances which have been proved to be hazardous to the human body but also substances which may possibly be harmful as well as those which have the potential to produce harmful substances through chemical reactions or similar processes.

One type of commonly known hazardous substances contained in fiber products is the substances which are used as synthetic dyes. Synthetic dyes are inexpensive and yet have excellent color-producing and fixing properties. Due to those characteristics, synthetic dyes have been widely used for the coloring of fiber or leather products. A high proportion of the synthetic dyes which are currently used worldwide are azo dyes which contain azo compounds as their main components. Azo compounds are a type of organic compound having a structure which includes at least one azo group connecting two organic groups in the form of R—N=N—R'. There are more than 2000 kinds of azo compounds. It has been known that some of the azo compounds are reduced by bacterial actions on the human skin or in the human intestine, enzymatic actions inside the human body or other similar processes, to eventually produce primary aromatic amines (which may hereinafter be referred to as "PAAs" according to a conventional usage) which are known or suspected to be cancer-causing substances. Accordingly, the use of PAAs which have been identified as or suspected to be cancer-causing substances, as well as azo dyes containing azo compounds which produce PAAs, in fiber products and other daily necessities have been regulated in the European Union (EU) as well as many other countries or regions. For example, the EU has 22 substances designated as specific PAAs whose use must be regulated. Two more substances are added in China and Japan have, with a total of 24 substances under regulations.

Another type of hazardous substances contained in fiber products is the perfluorocompounds (which may hereinafter be called the "PFCs" according to a conventional usage). PFCs have water-repellent and oil-repellent properties as well as high levels of thermal and chemical stabilities. Due to these characteristics, PFCs have been used as water-and-oil repellents for fiber products. PFCs have multiple homologs which differ from each other in the length of carbon chain. Perfluorooctane sulfonic acid (PFOS) and perfluorooctanic acid (PFOA), both of which have a carbon number of 8, cannot be easily decomposed in natural environments. Such substances are likely to persistently remain and be biologically accumulated. Meanwhile, it has been reported that experimental administration of PFCs to laboratory animals caused cancers, developmental disabilities and other problems. Therefore, in recent years, PFOS and its salt as well as other related substances have been banned from production or use, primarily in Western countries.

When fiber products are cleaned, alkylphenol ethoxylate (APEO) is used as a surface-active agent. When broken down, APEO produces alkylphenol (AP). It has been known that AP can interact with estrogen receptors in the human body and exhibit similar effects to natural hormones, causing endocrine disruptions (i.e. AP is an environmental hormone). Most of the APEOs currently used for fiber products are nonylphenol ethoxylate (NPEO). Accordingly, in recent years, NPEO has been added as a target of the use regulation in the EU.

As described to this point, there are various hazardous substances whose uses in fiber products have been regulated or banned. The regulations tend to be increasingly strengthened. Therefore, in recent years, the test for hazardous substances in fiber products has been even more important than before.

The EU has the "REACH" regulation, which includes regulations concerning the registration, evaluation, authorization and restriction of chemicals, including the hazardous substances mentioned earlier. Goods imported into the EU must be in conformity to REACH. As for worldwide evaluation standards concerning hazardous substances in fiber products, STANDARD 100 by OEKO-TEX, promoted by the OEKO-TEX® Association, has been commonly known, which comprehensively covers various fiber products ranging from raw fiber materials to finished textile products (see Non-Patent Literature 1). Manufacturers and other related parties have been required to obtain certification for conformity to this standard.

For the quantitative testing of hazardous substances as mentioned earlier, gas chromatographs (GC), liquid chromatographs (LC), gas chromatograph mass spectrometers (GC-MS), liquid chromatograph mass spectrometers (LC-MS) and other similar devices have been generally used (for example, see Non-Patent Literature 2 or 3).

However, even when the target is limited to the specific PAAs or azo compounds (azo dyes) which have already been regulated, the conventional analyzing techniques have the following problems:

(1) The detection sensitivity is generally low. For some substances, the sensitivity is considerably low.

(2) The influences of foreign substances cannot be sufficiently removed. The accuracy and sensitivity of the analysis for target substances are easily affected by foreign substances.

(3) An inefficiently long period of time is required for the analysis, since it is necessary to change the type of analyzing device or analysis conditions for each substance.

If the test needs to be performed for PFCs, AP, APEO or other targets in addition to the specific PAAs or azo compounds, it will be necessary to prepare various types of analyzing devices and repeat analyses multiple times while optimizing the analysis conditions for each substance. Such a task is extremely cumbersome and time-consuming. Thus, no satisfactory technique has been established so far which enables efficient testing for the many kinds of hazardous substances in fiber products with a high level of accuracy and sensitivity.

CITATION LIST

Non Patent Literature

Non Patent Literature 1: "What is STANDARD 100 by OEKO-TEX?". [online], [accessed on Oct. 15, 2018], the Internet Non Patent Literature 2: "Developing a method for the analysis of Azo Dyes using the Agilent 1290 Infinity LC Method Development System and the Agilent Method Scouting Wizard software", [online], [accessed on Oct. 15, 2018], the Internet Non Patent Literature 3: "Excellent Resolution of EU-Regulated Azo Dye Aryl Amines by GC-MS on the Rxi-35Sil MS GC Column", [online], [accessed on Oct. 18, 2018], the Internet

SUMMARY OF INVENTION

Technical Problem

In recent years, regulations on the use of hazardous substances have been even stricter, particularly in the EU and other countries or regions which are primary importers of fiber products. Accordingly, in the countries exporting fiber products, it has been increasingly necessary to test for hazardous substances in fiber products. However, in the current situation, the test requires a considerable amount of time and an accordingly high amount of cost, which unfavorably leads to higher prices of the fiber products or insufficient profits from those products. Conducting the analysis with a low level of accuracy or sensitivity lowers the reliability of the test and hinders the export of fiber products.

Many of the previously mentioned hazardous substances are also generally banned or regulated in other targets, such as industrial waste water, environmental water (e.g. river water), as well as goods other than fiber products, such as daily necessities or toys, although there are differences in criteria. Accordingly, the previously described situation also roughly applies in the testing for hazardous substances in those targets.

The present invention has been developed to solve the previously described problems. Its objective is to provide a hazardous substance analyzing system, as well as a program for analyzing hazardous substances, with which a quantitative test for hazardous substances in fiber products and various other samples can be efficiently performed with a high level of accuracy and sensitivity.

Solution to Problem

The hazardous substance analyzing system according to the present invention developed for solving the previously described problem is a hazardous substance analyzing system for quantitatively analyzing hazardous substances contained in a sample by using an analyzing device, in which:

a liquid chromatograph mass spectrometer is used as the analyzing device, the liquid chromatograph mass spectrometer including a liquid chromatograph for temporally separating substances contained in a sample to be analyzed and a tandem mass spectrometer for ionizing the substances in the sample temporally separated by the liquid chromatograph and detecting product ions generated by dissociating a specific kind of ion among ions produced by ionization: and the hazardous substance analyzing system includes:

a) an information storage section in which control information for performing an analysis according to two or more measurement methods is stored, the control information including at least a gradient condition related to a plurality of mobile phases in the liquid chromatograph as well as a retention time and a multiple reaction monitoring (MRM) transition for detecting each substance in the tandem mass spectrometer, and the two or more measurement methods selected from the following six measurement methods:

a1) a first measurement method for detecting, by a single analysis, a plurality of specific substances which are primary aromatic amines;

a2) a second measurement method for detecting, by a single analysis, a plurality of specific substances which are azo compounds, under the condition that a first mobile phase is used as one of the mobile phases in the liquid chromatograph;

a3) a third measurement method for detecting, by a single analysis, a plurality of specific substances which are azo compounds different from the substances designated as analysis targets in the second measurement method, under the condition that a second mobile phase different from the first mobile phase is used as one of the mobile phases in the liquid chromatograph;

a4) a fourth analysis method for detecting, by a single analysis, a plurality of specific substances which are perfluorocompounds;

a5) a fifth analysis method for detecting, by a single analysis, a plurality of specific substances which are alkylphenol ethoxylates; and a6) a sixth measurement method for detecting, by a single analysis, a plurality of specific substances which are alkylphenols:

b) a method selection assistant for displaying identifiers of the two or more measurement methods stored in the information storage section on a screen of a display unit and allowing a user to select one measurement method from the two or more measurement methods; and c) an analysis controller for reading, from the information storage section, the control information for the measurement method selected by a user with the method selection assistant, and controlling an operation of the liquid chromatograph and an operation of the tandem mass spectrometer according to the read control information.

The program for analyzing hazardous substances is a computer program to be installed in a computer used for controlling an operation of a liquid chromatograph mass spectrometer and processing data obtained by an analysis using the liquid chromatograph mass spectrometer, in order to quantitatively analyze hazardous substances in a sample, the liquid chromatograph mass spectrometer including a liquid chromatograph for temporally separating substances contained in a sample to be analyzed and a tandem mass spectrometer for ionizing the substances in the sample temporally separated by the liquid chromatograph and detecting product ions generated by dissociating a specific kind of ion among ions produced by ionization, the program including:

a) a method package in which control information for performing an analysis according to two or more measurement methods is included beforehand, the control information including at least a gradient condition related to a plurality of mobile phases in the liquid chromatograph as well as a retention time and a multiple reaction monitoring (MRM) transition for detecting each substance in the tandem mass spectrometer, the two or more measurement methods selected from the following six measurement methods:

a1) a first measurement method for detecting, by a single analysis, a plurality of specific substances which are primary aromatic amines;

a2) a second measurement method for detecting, by a single analysis, a plurality of specific substances which are azo compounds, under the condition that a first mobile phase is used as one of the mobile phases in the liquid chromatograph;

a3) a third measurement method for detecting, by a single analysis, a plurality of specific substances which are azo compounds different from the substances designated as analysis targets in the second measurement method, under the condition that a second mobile phase different from the first mobile phase is used as one of the mobile phases in the liquid chromatograph;

a4) a fourth analysis method for detecting, by a single analysis, a plurality of specific substances which are perfluorocompounds;

a5) a fifth analysis method for detecting, by a single analysis, a plurality of specific substances which are alkylphenol ethoxylates; and a6) a sixth measurement method for detecting, by a single analysis, a plurality of specific substances which are alkylphenols:

and the program configured to make the computer function as:

b) a method selection assistance functional section for displaying identifiers of the two or more measurement methods included in the method package on a screen of a display unit and allowing a user to select one measurement method from the two or more measurement methods; and c) an analysis control functional section for obtaining, from the method package, the control information for the measurement method selected by a user with the method selection assistant functional section, and controlling an operation of the liquid chromatograph and an operation of the tandem mass spectrometer according to the obtained control information.

The "single analysis" in the present invention means a sequential analysis performed during a period of time from an injection of a liquid sample into the mobile phase using an injector of the liquid chromatograph to the completion of a liquid chromatographic mass spectrometry for detecting various substances in the sample.

The program for analyzing hazardous substances according to the present invention is a program for operating a computer which controls an operation of a liquid chromatograph mass spectrometer capable of an MS/MS analysis and performs data processing (this computer may be either a general-purpose personal computer or a dedicated computer which is built in the device). Such a program is normally offered to users in the form a CD-ROM, DVD-ROM, memory card, USB memory (dongle) or other forms of record media, or in the form of data transferred through the Internet or similar communication network. Needless to say, the program for analyzing hazardous substances according to the present invention may previously be installed in a computer included in a system when the system is newly purchased by a user.

In the present invention, the second and third measurement methods are methods primarily aimed at exhaustively analyzing azo dyes whose uses are regulated in the EU as well as other countries or regions. The plurality of specific substances designated as the analysis targets in the second measurement method may include the 44 components (azo dyes) listed in FIGS. 4 and 5. The plurality of specific substances designated as the analysis targets in the third measurement method may include the seven components (azo dyes) listed in FIG. 6. In some cases, one or more of the 44 and 7 kinds of components may be excluded from the analysis targets.

The first measurement method is a method primarily aimed at exhaustively analyzing specific kinds of primary aromatic amines whose uses are regulated in the EU as well as other countries or regions among the primary aromatic amines which are produced from the azo compounds contained in the aforementioned azo dyes. The plurality of specific substances designated as the analysis targets in the first measurement method may include the 24 components listed in FIG. 3.

The fourth measurement method is a method primarily aimed at exhaustively analyzing specific kinds of perfluorocompounds whose uses are regulated or banned in the EU as well as other countries or regions. The plurality of specific substances designated as the analysis targets in the fourth measurement method may include the 24 components listed in FIG. 7.

The fifth measurement method is a method primarily aimed at exhaustively analyzing specific kinds of alkylphenol ethoxylates whose uses are regulated in the EU as well as other countries or regions. The plurality of specific substances designated as the analysis targets in the fifth measurement method may include the two components listed in FIG. 9.

The sixth measurement method is a method primarily aimed at exhaustively analyzing specific kinds of alkylphenols which are breakdown products of alkylphenol ethoxylates. The plurality of specific substances designated as the analysis targets in the sixth measurement method may include the four components listed in FIG. 9.

In the present invention, two or more measurement methods selected from those six measurement methods are previously stored in the information storage section. The method selection assistant displays a list of the method names or similar identifiers of the two or more measurement methods on the screen of the display unit. A user selects one of those measurement methods according to the purpose of the analysis or other criteria. The kinds of mobile phases to be used in the liquid chromatograph are specified for each measurement method. In some cases, the type of column may also be changed depending on the measurement method. Accordingly, in addition to the sample to be analyzed, the user prepares the mobile phases specified for each measurement method as well as replace the column with another one as needed.

After the preparation for the analysis has been thus completed, the user performs a predetermined operation. Then, the analysis controller obtains the control information for the selected measurement method, which specifically includes a gradient elution program as well as the retention time and MRM transition (m/z values of a precursor ion and a product ion) for each substance, collision energy, and other items of information. According to the control information, the analysis controller controls the operations of the liquid chromatograph and the tandem mass spectrometer. If the plurality of components designated as the analysis targets in the selected measurement method are contained in the sample, those components are appropriately separated from each other while passing through the column of the liquid chromatograph. The separated components are sequentially detected in the tandem mass spectrometer.

By this measurement, an extracted ion chromatogram (which is also conventionally called a "mass chromatogram") is created for each of the components designated as the analysis targets in the selected measurement method. If a component is present in the sample, a peak appears on the corresponding extracted ion chromatogram. Therefore, it is possible to compute the area of that peak and calculate the concentration or amount of the contained component from the peak area with reference to a previously created calibration curve. For example, in the case of a component whose amount of use is regulated, the calculated amount of the component can be compared with a regulatory value to determine whether or not the component falls within a permissible range. For a component whose use is banned, what is necessary is to simply determine whether or not that component has been detected.

As a preferable configuration of the present invention, at least the control information concerning the second and third measurement methods may be stored in the information storage section, and the method selection assistant may be configured to allow a user to select one of the second and third measurement methods.

According to this configuration, the azo dyes whose uses are regulated in the EU as well as other countries or regions can be exhaustively investigated by performing two analyses.

As a further preferable configuration, the control information concerning the first measurement method may also be stored in the information storage section, and the method selection assistant may be configured to allow a user to select one of the first, second and third measurement methods.

According to this configuration, almost all hazardous substances related to synthetic dyes, i.e. both the specific kinds of primary aromatic amines which have been identified as or suspected to be cancer-causing substances and the azo dyes which produce those primary aromatic amines, can be exhaustively investigated by performing three analyses.

In the case of testing fiber products for hazardous substances, it is more preferable that the control information concerning all of the six measurement methods be stored in the information storage section, and the method selection assistant be configured to allow a user to select one of the six measurement methods.

According to this configuration, various hazardous substances which are commonly used or may possibly be used as synthetic dyes, water-and-oil repellents or surface-active agents for fiber products can be exhaustively investigated by performing six analyses using the same analyzing device.

As one mode of the hazardous substance analyzing system according to the present invention, the system may be configured as follows:
the tandem mass spectrometer is a triple quadrupole mass spectrometer; and
the control information stored in the information storage section includes a collision energy corresponding to one or more MRM transitions specified for each substance.

According to this configuration, the collision energy can be optimized for each MRM transition to detect a target substance with a high level of sensitivity.

A quadrupole time-of-flight mass (Q-TOF) mass spectrometer may also be used in place of the triple quadrupole mass spectrometer, in which case the intensity data for a product ion having a specific m/z value can be extracted from the obtained product-ion spectrum data, to obtain ion intensity data for a specific MRM transition in a similar manner to the MRM measurement.

Advantageous Effects of Invention

In the present invention, structurally similar substances (e.g. azo dyes) contained in a sample are initially separated from each other by a liquid chromatograph and subsequently detected by an MS/MS analysis with a high level of ion-selecting power. The influence of foreign substances contained in the sample is thereby removed, and the target hazardous substances can be detected with a high level of accuracy and sensitivity. A plurality of compounds used for the same purpose, such as the synthetic dyes, water-and-oil repellents or surface-active agents, can be simultaneously analyzed under the same measurement method. Those various hazardous substances can be analyzed with a single analyzing device by merely changing the measurement method. Therefore, as compared to the conventional analyzing techniques, the overall analysis time can be shortened, and the test can be efficiently performed, for example, in the case of an exhaustive analysis of major hazardous substances in fiber products.

Furthermore, according to the present invention, an analysis limited to a specific kind of hazardous substances that the user desires to analyze can also be selectively performed with the same analyzing device. Therefore, it is unnecessary to prepare various types of analyzing devices. This is advantageous for reducing the overall cost of the analysis. It is also unnecessary to use different analyzing devices for each substance to be subjected to the test. Accordingly, the operation of the analyzing device will not be cumbersome. This lessens the burden on the operator of the device as well as decreases incorrect operations or similar problems.

BRIEF DESCRIPTION OF DRAWINGS

FIG. 3 is a list of the substances to be analyzed in a simultaneous analysis method for specific aromatic amines.

FIG. 4 is a list of the substances to be analyzed in a simultaneous analysis method for the first group of azo dyes.

FIG. 5 is a list of the substances to be analyzed in a simultaneous analysis method for the first group of azo dyes.

FIG. 6 is a list of the substances to be analyzed in a simultaneous analysis method for the second group of azo dyes.

FIG. 7 is a list of the substances to be analyzed in a simultaneous analysis method for PFCs.

FIG. 8 is a list of the substances to be analyzed in a simultaneous analysis method for AP.

FIG. 9 is a list of the substances to be analyzed in a simultaneous analysis method for APEO.

FIG. 10 is a table showing the MS/MS analysis conditions for each substance in the simultaneous analysis method for specific aromatic amines.

FIG. 11 is a table showing the MS/MS analysis conditions for each substance in the simultaneous analysis method for the first group of azo dyes.

FIG. 12 is a table showing the MS/MS analysis conditions for each substance in the simultaneous analysis method for the first group of azo dyes.

FIG. 13 is a table showing the MS/MS analysis conditions for each substance in the simultaneous analysis method for the second group of azo dyes.

FIG. 14 is a table showing the MS/MS analysis conditions for each substance in the simultaneous analysis method for PFCs.

FIG. 15 is a table showing the MS/MS analysis conditions for each substance in the simultaneous analysis method for AP.

FIG. 16 is a table showing the MS/MS analysis conditions for each substance in the simultaneous analysis method for APEO.

FIG. 17 is a table showing the MS/MS analysis conditions for each substance in the simultaneous analysis method for APEO.

DESCRIPTION OF EMBODIMENTS

A hazardous substance analyzing system as one embodiment of the present invention is hereinafter described with reference to the attached drawings.

Figure 1:
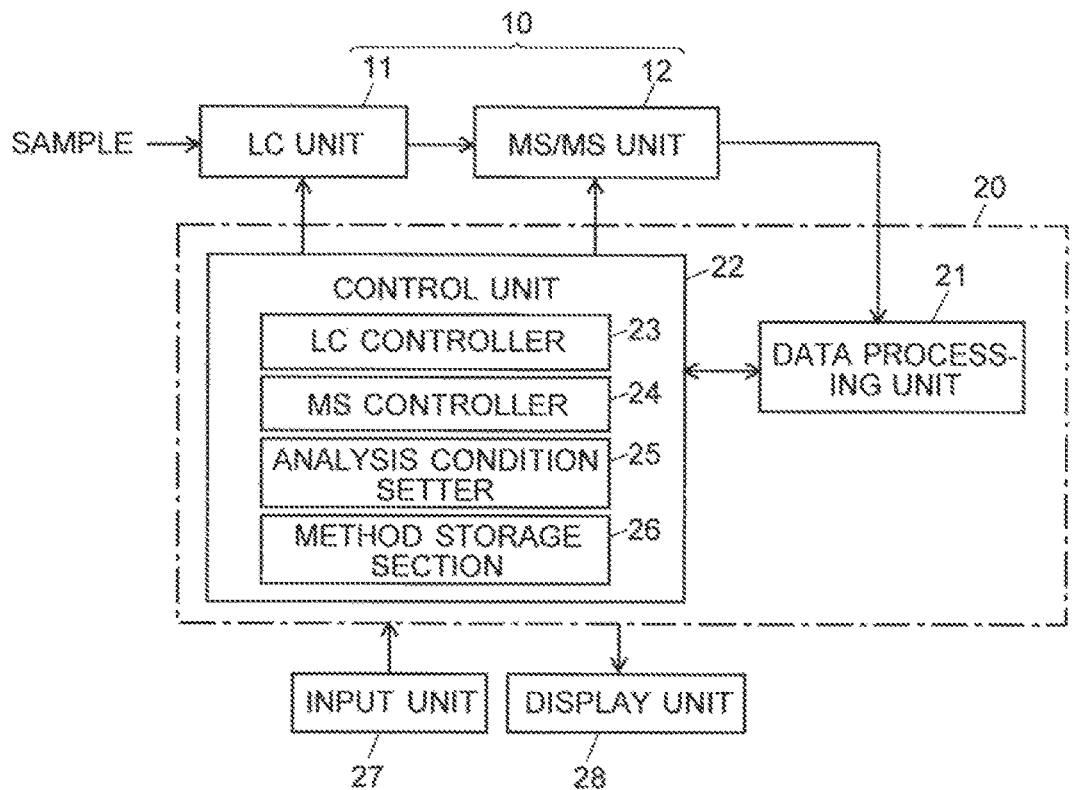
FIG. 1 is a schematic configuration diagram of a hazardous substance analyzing system as one embodiment of the present invention.

FIG. 1 is a schematic configuration diagram of the hazardous substance analyzing system according to the present embodiment. In principle, the present hazardous substance analyzing system is a system for testing for hazardous substances in fiber products, although the system can also be used for the testing of other objects, such as daily necessities, toys as well as river water or other types of environmental water.

As shown in FIG. 1, the hazardous substance analyzing system includes, as the measurement section 10, a liquid chromatograph mass spectrometer including a liquid chromatograph (LC) unit 11 and a triple quadrupole mass spectrometer (MS/MS) unit 12. It also includes a control unit 22 for controlling the operations of the LC unit 11 and the MS/MS unit 12, a data processing unit 21 for processing data obtained with the MS/MS unit 12, as well as an input unit 27 and a display unit 28 serving as the user interface.

Though not shown, the LC unit 11 includes: a plurality of mobile phase containers which respectively contain different kinds of mobile phases: a mixer for mixing two kinds of mobile phases at a predetermined mixture ratio; a liquid supply pump for supplying the mobile phase mixed by the mixer: an injector for injecting a predetermined amount of liquid sample into the mobile phase: a column for temporally separating the substances in the liquid sample; a column oven for controlling the temperature of the column; and other related components.

Though also not shown, the MS/MS unit 12 includes: an ESI ion source for ionizing the substances in the introduced liquid sample by an electrospray ionization (ESI) method; a front quadrupole mass filter for selectively allowing an ion having a specific mass-to-charge-ratio (m/z) value to pass through as the precursor ion: a collision cell for dissociating the precursor ion by collision induced dissociation (CID); a rear quadrupole mass filter for selectively allowing a product ion having a specific m/z value to mass through among the various kinds of product ions generated by CID; a detector for detecting ions; and other related components.

The control unit 22 includes an analysis controller (e.g., LC controller 23 and MS controller 24), method selection assistant (e.g., analysis condition setter 25), information storage section (e.g., method storage section 26) and other functional blocks. The data processing unit 21 calculates a quantitative value (content or concentration value) for each of the predetermined kinds of hazardous substances based on the data obtained with the MS/MS unit 12. It also determines whether or not the quantitative value exceeds a prescribed regulatory value, and outputs the determination result along with the quantitative value.

The control unit 22 and data processing unit 21 are actually a personal computer, which is denoted by reference sign 20 in FIG. 1. The functions of the data processing unit 21 and the control unit 22 are achieved by executing, on the personal computer, a predetermined controlling and processing program installed on the same computer.

Figure 2:
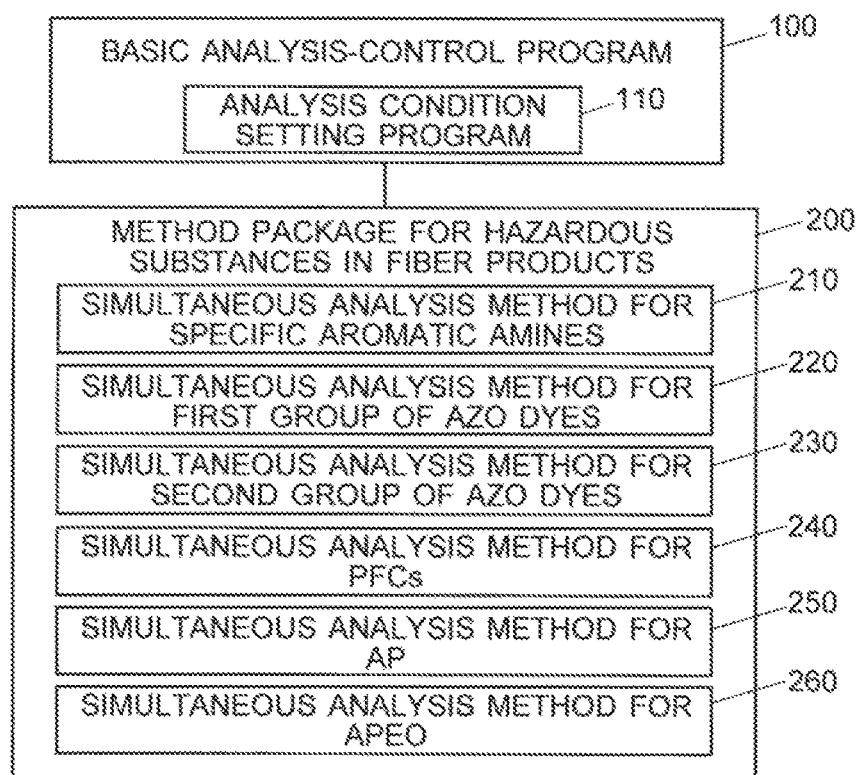
FIG. 2 is a schematic diagram showing the contents of the controlling and processing application software installed in a computer in the hazardous substance analyzing system according to the present embodiment.

FIG. 2 is a schematic diagram showing the contents of the application software and method package installed in the personal computer 20 in the present system.

The application software and method package are normally offered to users in the form a CD-ROM, DVD-ROM, memory card, USB memory (dongle) or other forms of record media, or in the form of data transferred through the Internet or similar communication network. Needless to say, the program for analyzing hazardous substances according to the present invention may previously be installed in a computer included in a system when the system is newly purchased by a user.

A basic analysis-control program 100 is a piece of basic software for making the computer execute (1) basic controls for carrying out analysis operations in the measurement section 10, and (2) data processing to be performed in the data processing unit 21. The basic analysis-control program 100 includes an analysis condition setting program 110 having the function of allowing users to enter various parameters and analysis conditions which are necessary for an analysis. The basic analysis-control program 100 is a program which is always used in an analysis regardless of what kind of sample is to be analyzed.

In the system according to the present embodiment, a number of measurement methods specifically prepared for an exhaustive quantitative analysis for major hazardous substances in fiber products are compiled into a "method package 200 for hazardous substances in fiber products" and introduced into the personal computer 20. This method package 200 is stored in the method storage section 26. Each analysis method in the method package 200 includes control information, such as the analysis conditions and parameters which are suitable for quantitatively analyzing a plurality of specific substances.

Specifically, each analysis method includes the following items of information as the analysis conditions and parameters in the LC unit 11: type of column, kind of mobile phase, gradient elution conditions (gradient program), flow rate (or flow velocity) of the mobile phase, temperature of the column oven, and amount of sample injection. Each analysis method also includes the following items of information as the analysis conditions and parameters in the MS/MS unit 12: type of ion source (type of ionization method), ionization mode (either the positive or negative ionization mode), temperatures of the ion source, desolvation tube and other related elements, flow rate of the nebulizer gas in the ion source or other kinds of gas, retention time of each substance to be detected, MRM transitions (m/z values of the precursor ion and the product ion) of the target ion (or quantifier ion) and the qualifier ion (or reference ion) for each substance to be detected, collision energy corresponding to each MRM transition, as well as DC bias voltages to be respectively applied to relevant components, such as a quadrupole mass filter.

The method package 200 for hazardous substances in fiber products m the present embodiment includes the following six analysis methods: simultaneous analysis method 210 for specific aromatic amines, simultaneous analysis method 220 for the first group of azo dyes, simultaneous analysis method 230 for the second group of azo dyes, simultaneous analysis method 240 for PFCs, simultaneous analysis method 250 for AR and simultaneous analysis method 260 for APEO.

The kinds of substances or compounds to be analyzed in each analysis method, as well as the main analysis conditions and parameters, will be hereinafter described.

[1] Simultaneous Analysis Method for Specific Aromatic Amines

The substances to be analyzed by this analysis method are major kinds of primary aromatic amines (PAAs), which are specifically 24 compounds listed in FIG. 3. They include 22 kinds of compounds whose uses are currently regulated in the EU, along with two kinds of compounds additionally regulated in Japan and China. FIG. 3 shows the compound name, molecular formula, CAS number and exact mass for each compound.

The main LC analysis conditions and parameters in the present analysis method are as follows:
  Column type: ODS column (specifically, Shim-pack FC-ODS 3 μm C18 100 A. 150 mm L×2 mm I.D., manufactured by Shimadzu GLC Ltd.)
  Mobile phase A: water with 5 mM ammonium acetate (pH 3.0)
  Mobile phase B: acetonitrile
  Analysis period: 13 minutes
  Gradient elution conditions: 2% mobile phase B (0.00 min. to 1.00 min.)→100% mobile phase B (6.00 min. to 9.00 min.)→35% mobile phase B (9.01 min. to 13.00 min.)

The retention time and MRM transitions, which are the main MS/MS analysis conditions in the present analysis method, are as shown in FIG. 10. In principle, the MRM transition of one quantifier ion and those of two reference ions (which are ions to be used for determining whether or not the quantifier ion is certainly the target substance, based on their ion-intensity ratios to the quantifier ion) are specified for each compound. The ionization mode is positive for all substances.

[2] Simultaneous Analysis Method for the First Group of Azo Dyes

The substances to be analyzed by this analysis method are a portion of the entire group of the azo dyes containing azo compounds which produce PAAs mentioned earlier. Specifically, a total of 44 kinds of dyes listed in FIGS. 4 and 5 are included in this group. There are many kinds of azo dyes whose uses are regulated due to their hazardous natures, and it is difficult to detect all of them by a single analysis under the same analysis conditions. Accordingly, they have been divided into the first group (44 kinds) and second group (7 kinds) so that the azo dyes can be detected under different analysis conditions for each group. FIGS. 4 and 5 show the dye name (color index name), molecular formula of the contained azo compound, CAS number and exact mass for each dye.

The main LC analysis conditions in the present analysis method are as follows:
  Column type: ODS column (specifically, Shim-pack FC-ODS 3 μm C18 100 A, 75 mm L×2 mm I.D., manufactured by Shimadzu GLC Ltd.)
  Mobile phase A: water with 5 mM ammonium acetate
  Mobile phase B: acetonitrile:water (9:1), with 5 mM ammonium acetate
  Analysis period: 20 minutes
  Gradient elution conditions: 35% mobile phase B (0.00) min. to 0.50 min.)→100% mobile phase B (12.00) min. to 17.00 min.)→35% mobile phase B (17.10 min. to 20.00 min.)

As is commonly known, ammonium acetate, which is added to both mobile phases A and B, is acidic. Accordingly, the mixed mobile phase is weakly acidic throughout the entire analysis period regardless of the mixture condition of the two mobile phases.

The retention time and MRM transitions, which are the main MS/MS analysis conditions in the present analysis method, are as shown in FIGS. 11 and 12. In principle, the MRM transition of one quantifier ion and those of two reference ions are specified for each compound, although only one reference ion is specified for some substances for which two or more appropriate reference ions cannot be selected. In the present method, the ionization mode is switched in the middle of the analysis so that the 37 substances from Nos. 1 to 37 in FIGS. 11 and 12 are analyzed in the positive ionization mode, while the remaining seven substances from No. 38 to No. 44 are analyzed in the negative ionization mode.

[3] Simultaneous Analysis Method for the Second Group of Azo Dyes

The substances to be analyzed by this analysis method are azo dyes containing azo compounds that cannot be analyzed by the simultaneous analysis method for the first group of azo dyes. Specifically, seven kinds of dyes listed in FIG. 6 are included in this group. Similar to FIGS. 4 and 5, FIG. 6 shows the dye name, molecular formula of the contained azo compound, CAS number and exact mass for each dye.

The main LC analysis conditions in the present analysis method are as follows:
  Column type: ODS column (specifically, Shim-pack FC-ODS 3 μm C18 100 A, 75 mm L×2 mm I.D., manufactured by Shimadzu GLC Ltd.)
  Mobile phase A: water with 5 mM ammonium bicarbonate
  Mobile phase B: acetonitrile
  Analysis period: 10 minutes Gradient elution conditions: 2% mobile phase B (0.00 min. to 0.50 min.)→90% mobile phase B (6.00 min. to 7.50 min.)→2% mobile phase B (7.51 min. to 10.00 min.)

Ammonium bicarbonate, which is added to mobile phase A, has a higher pH than ammonium acetate. This additive is commonly used for making the pH of a mobile phase be roughly neutral (within a range from neutrality to weak alkalinity) Accordingly, the mixed mobile phase in the present analysis method is neutral or weakly basic throughout the entire analysis period, unlike the mobile phase used in the simultaneous analysis method for the first group of azo dyes.

The retention time and MRM transitions, which are the main MS/MS analysis conditions in the present analysis method, are as shown in FIG. 13. It should be noted that the analyses for three dyes named "Acid Red 26", "Direct Red 28" and "Direct Black 38" are each performed in both positive and negative ionization modes. Consequently. 10 detection results are obtained for the seven kinds of substances. The detection sensitivity for the three aforementioned dyes may be higher in either the positive ionization mode or the negative ionization mode, depending on an instrumental error of the device or some conditions other than the ionization mode. Therefore, the analysis for those dyes is performed in each of the positive and negative ionization modes, and a result obtained with a higher level of sensitivity is adopted. As for the other four dyes, the sensitivity in the negative ionization mode is normally higher than in the positive ionization mode. Therefore, the analysis is only performed in the negative ionization mode.

[4] Simultaneous Analysis Method for PFCs

The substances to be analyzed by this analysis method are perfluorocompounds whose uses are banned or regulated by the EU. Oeko-Tex or other organizations. Specifically, they are the 24 kinds of compounds listed in FIG. 7. FIG. 7 shows the compound name, abbreviation, molecular formula, CAS number and exact mass for each compound.

The main LC analysis conditions in the present analysis method are as follows;
Column type: ODS column (specifically, Shim-pack FC-ODS 3 μm C18 100 A, 75 mm L×2 mm I.D., manufactured by Shimadzu GLC Ltd.)
Mobile phase A: water with 5 mM ammonium acetate
Mobile phase B: acetonitrile
Analysis period: 13 minutes
Gradient elution conditions: 10% mobile phase B (0.00 min. to 0.50 min.)→85% mobile phase B (8.50 min.) →95% mobile phase B (8.60 min. to 10.00 min.) →10% mobile phase B (10.10 min. to 13.00 min.)

The retention time and MRM transitions, which are the main MS/MS analysis conditions in the present analysis method, are as shown in FIG. 14. The ionization mode is negative for all substances.

[5] Simultaneous Analysis Method for AP

The substances to be analyzed by this analysis method are alkylphenols whose uses are regulated in the EU and other countries or regions. Specifically, they are the four kinds of compounds listed in FIG. 8. FIG. 8 shows the compound name, abbreviation, molecular formula, and exact mass for each compound.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: water
Mobile phase B: acetonitrile
Analysis period: 11 minutes
Gradient elution conditions: 50% mobile phase B (0.00 min. to 0.50 min.)→95% mobile phase B (7.00 min. to 9.00 min.)→50% mobile phase B (9.10 min. to 11.00 min.)

The retention time and MRM transitions, which are the main MS/MS analysis conditions in the present analysis method, are as shown in FIG. 15. The ionization mode is negative for all substances. In the present case, only one reference ion can be selected for two kinds of compounds: NP and 4-n-OP. No reference ion is used for 4-n-NP and 4-t-OP, since no proper reference ion can be selected for these two compounds.

[6] Simultaneous Analysis Method for APEO

The substances to be analyzed by this analysis method are alkylphenol ethoxylates which have the potential to produce alkylphenols mentioned earlier. Specifically, they are the two kinds of compounds listed in FIG. 9, i.e. NPEO and OPEO. It should be noted that each of these two kinds of compounds has many homologs which differ from each other in the number of C2H4O, n. Those homologs have different masses. Accordingly, the substances to be detected in the present case are limited to the homologs of NPEO with n ranging from 3 to 17 and those of OPEO with n ranging from 3 to 16. A different MRM transition is set for each of those homologs.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: 10 mM ammonium acetate—water (pH 3.6)
Mobile phase B: acetonitrile
Analysis period: 7 minutes
Gradient elution conditions: 70% mobile phase B (0.00 min. to 1.00 min.)→95% mobile phase B (1.01 min. to 5.00 min.)→70% mobile phase B (5.10 min. to 7.00 min.)

The retention time and MRM transitions, which are the main MS/MS analysis conditions in the present analysis method, are as shown in FIGS. 16 and 17. The ionization mode is positive for all substances.

The type of column is the OSD column in all six analysis methods. However, the column length is not the same: 150 mm for the simultaneous analysis method for specific aromatic amines, and 75 mm for the other methods. Accordingly, when an analysis using the simultaneous analysis method for specific aromatic amines is to be performed, the operator must replace the column with another one, or select the column to be used from among a plurality of columns arranged parallel to each other in a selectable form. The operator also needs to prepare mobile phases for each analysis method.

As described earlier, the analysis methods 210-260 included in the method package 200 for hazardous substances m fiber products respectively contain different LC analysis conditions and MS/MS analysis conditions, or different parameter values according to those analysis conditions. In an execution of an analysis, the basic analysis-control program 100 controls the operations of the relevant components according to the analysis conditions or parameter values contained in the analysis methods 210-260.

Though not shown in FIGS. 10-17, optimum values of the collision energy (which is practically the DC bias voltage applied to the ion guide placed within the collision cell, for example), DC bias voltages applied to the quadrupole mass filters and other parameters are also specified for each MRM transition.

The procedure and processing for carrying out a test for hazardous substances in fiber products using the hazardous substance analyzing system according to the present embodiment are hereinafter described.

An operator prepares a liquid sample from a fiber product to be analyzed. This sample preparation task is performed by the operator according to an ordinary procedure using a conventional method: The fiber product to be analyzed is initially divided into predetermined sizes (weights). The obtained pieces are placed in a centrifuge tube. After a predetermined amount of methanol is injected into the centrifuge tube, the tube is ultrasonically vibrated at a predetermined temperature for a predetermined period of time to promote the extraction of components from the fiber pieces. A centrifugal separation is subsequently performed. The obtained extract is temporarily dried and subsequently dissolved in a predetermined solvent to once more form a solution. This solution is passed through a filter to remove fine impurities and eventually obtain the sample.

The sample prepared in the previously described manner is subjected to an analysis using the hazardous substance analyzing system according to the present embodiment as follows: The operator determines which one of the six analysis methods described earlier should be used for the analysis, prepares mobile phases corresponding to the selected analysis method, and sets them in the LC unit 11. If the column needs to be replaced, the operator also replaces the column with another one corresponding to the selected analysis method. Then, the operator performs a predetermined operation using the input unit 27 to execute the basic analysis-control program 100 on the personal computer 20. Upon execution of the analysis condition setting program 110 in the basic analysis-control program 100, the analysis condition setter 25 begins to operate and displays a window on the display unit 28 which allows the operator to select and indicate one of the six analysis methods stored in the method storage section 26. This window includes a list showing the names of the six analysis methods. The operator selects the analysis method to be executed and issues a command to initiate the measurement.

Upon receiving the command to initiate the measurement, the LC controller 23 and the MS controller 24 read their respective analysis conditions and parameter values specified in the selected analysis method, and control relevant components in the LC unit 11 and the MS/MS unit 12 according to the parameter values and other items of information.

For example, if the selected method is the simultaneous analysis method for the first group of azo dyes, the LC controller 23 controls the mixer in the LC unit 11 so that the mobile phases A and B will initially be mixed at a ratio of 65% to 35% and supplied to the column. This mixture ratio is maintained until the lapse of 0.50 minutes from the point in time where the sample was injected from the injector into the mobile phase (0.00 minute). While the lapse time is within a range from 0.50 minutes to 12.00 minutes, the mixer is controlled so that the mixture ratio of mobile phase B linearly increases from 35% to 100%. This mixture ratio (mobile phase B: 100%) is maintained while the lapse time is within a range from 12.00 minutes to 17.00 minutes. While the lapse time from the sample injection point is within a range from 17.00 minutes to 17.10 minutes, the mixer is controlled so that the mixture ratio of mobile phase B linearly decreases from 100% to 35%. This mixture ratio (mobile phase B: 35%) is maintained from 17.10 minutes on.

If the sample contains one or more of the azo compounds corresponding to the 44 azo dyes shown in FIGS. 4 and 5, each azo compound will be separated from the other substances according to its retention time, as the mixture ratio of the mobile phases A and B is varied with time while the mobile phase is maintained in the weakly acidic state in the previously described manner.

Meanwhile, the MS controller 24 specifies a detection time range for each substance by setting a predetermined width of time centered on the retention time specified for each substance in the selected analysis method. After the point of injection of the sample, the MS controller 24 controls each relevant section in the MS/MS unit 12 within the detection time range assigned to each substance so as to perform MRM measurements corresponding to the MRM transitions of the quantifier ion and the reference ion specified for the substance concerned. The controller also changes the applied voltages to the relevant components according to the collision energy and other parameters specified for the MRM transition. As is commonly known, triple quadrupole mass spectrometers can perform MRM measurements for different MRM transitions within the same time range in an effectively concurrent form (or to be exact, by a time-division control). Therefore, no problem will arise if the detection time ranges for different substances overlap each other, or if the MRM measurements for the multiple ions (i.e. quantifier ion and reference ions) must be performed within the same detection time range.

Figure 18:
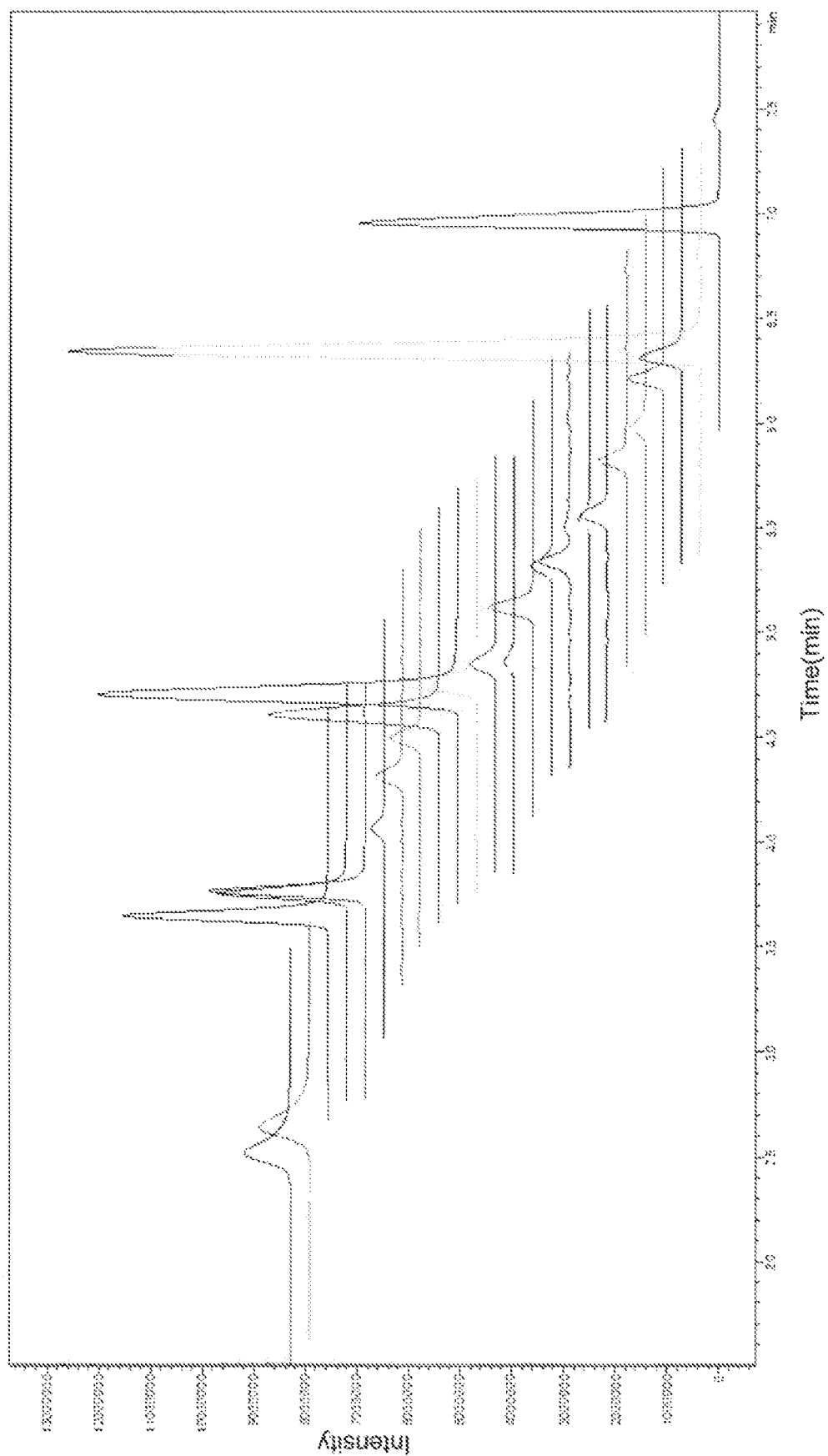
FIG. 18 is a measured example of an extracted ion chromatogram obtained by an analysis using the simultaneous analysis method for specific aromatic amines.
Figure 19:
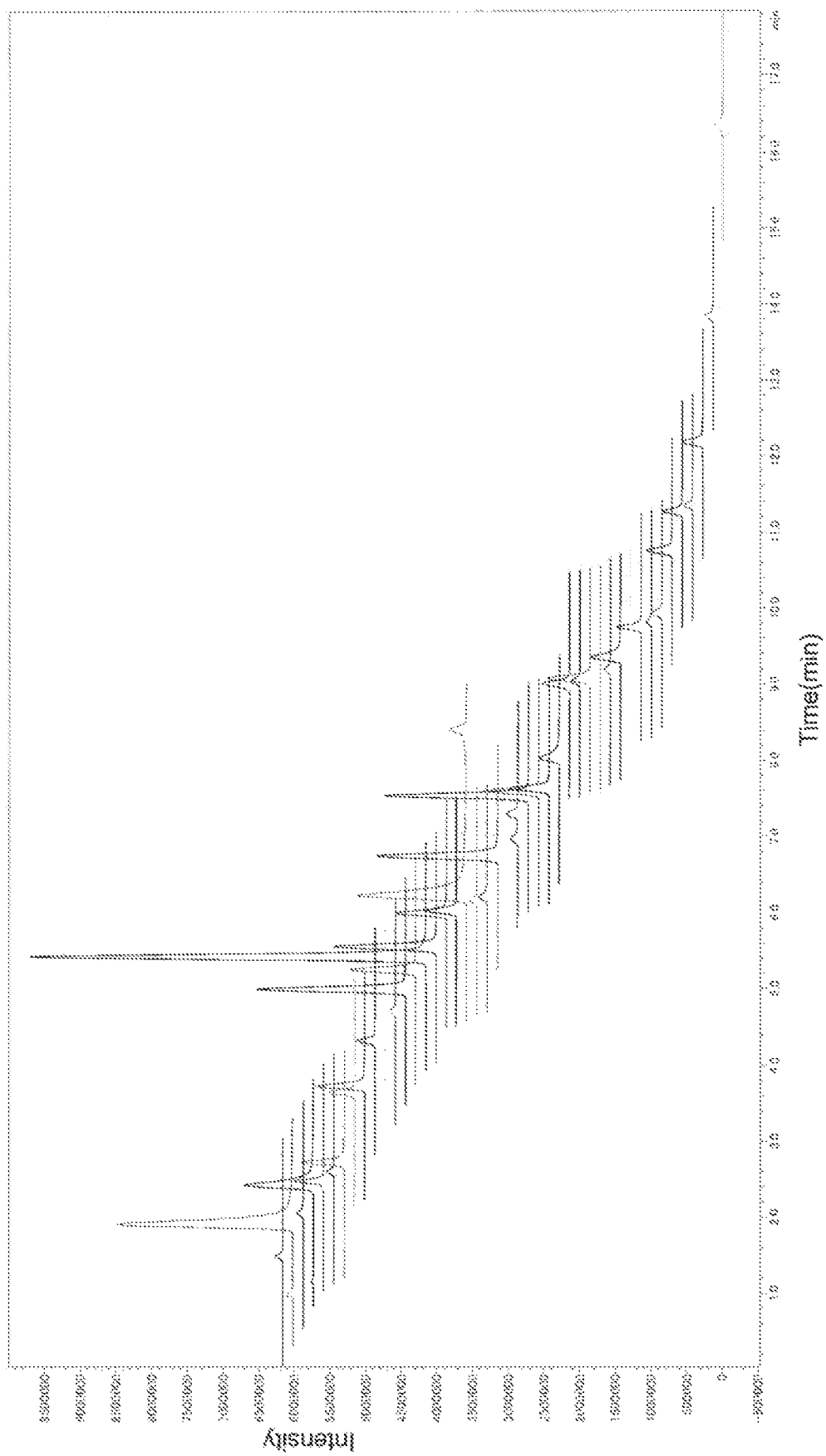
FIG. 19 is a measured example of an extracted ion chromatogram obtained by an analysis using the simultaneous analysis method for the first group of azo dyes.
Figure 20:
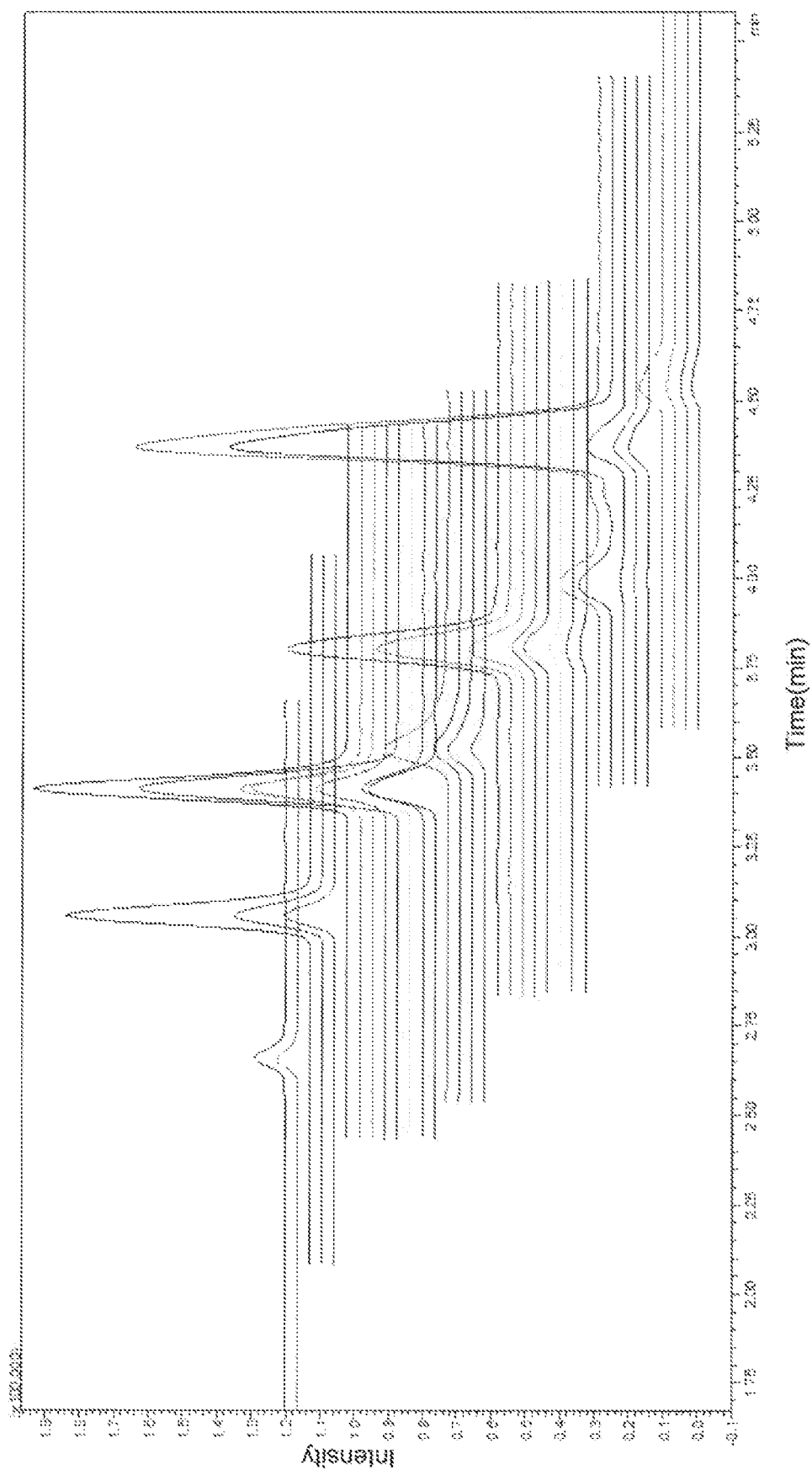
FIG. 20 is a measured example of an extracted ion chromatogram obtained by an analysis using the simultaneous analysis method for the second group of azo dyes.
Figure 21:
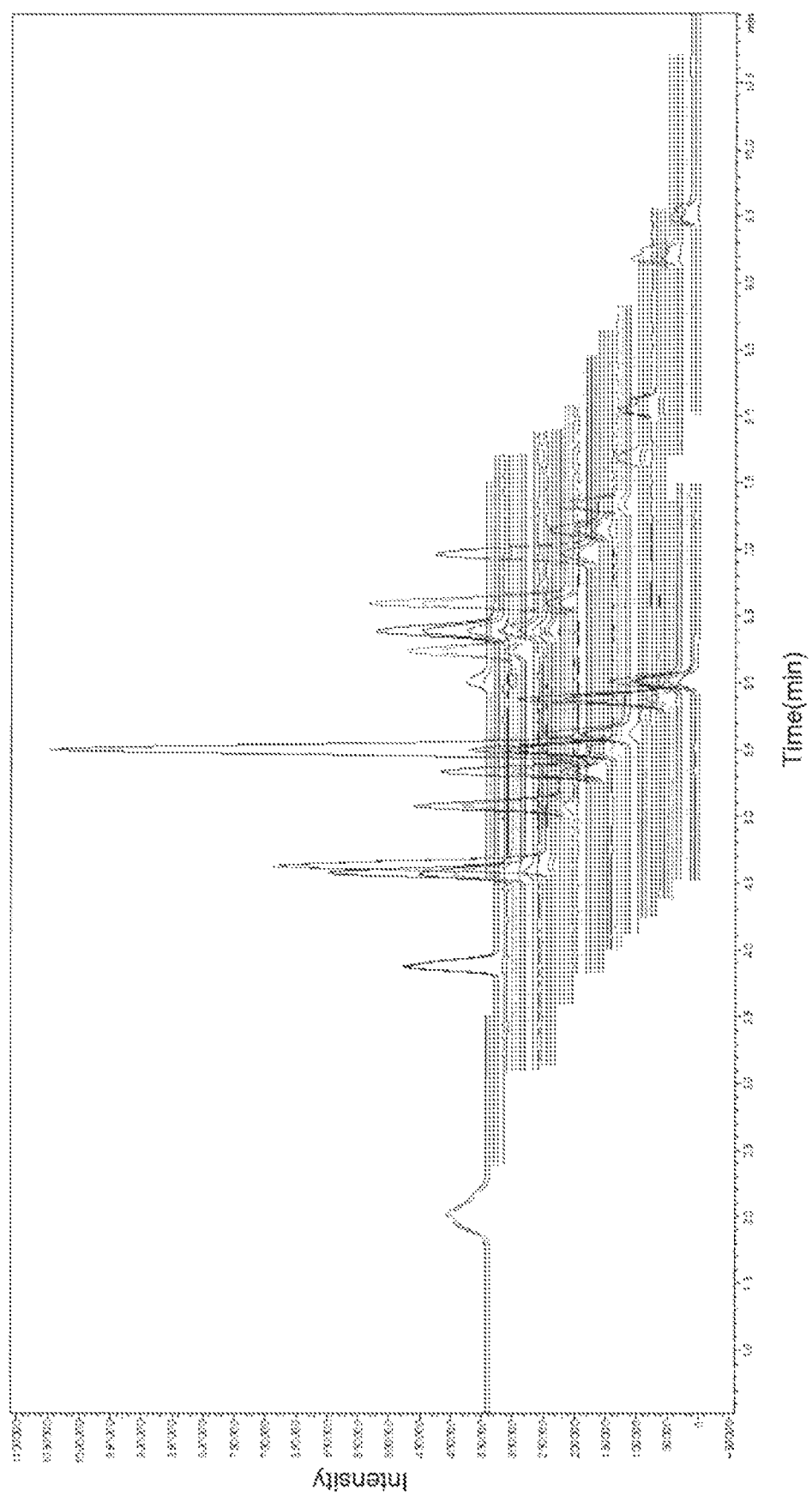
FIG. 21 is a measured example of an extracted ion chromatogram obtained by an analysis using the simultaneous analysis method for PFCs.
Figure 22:
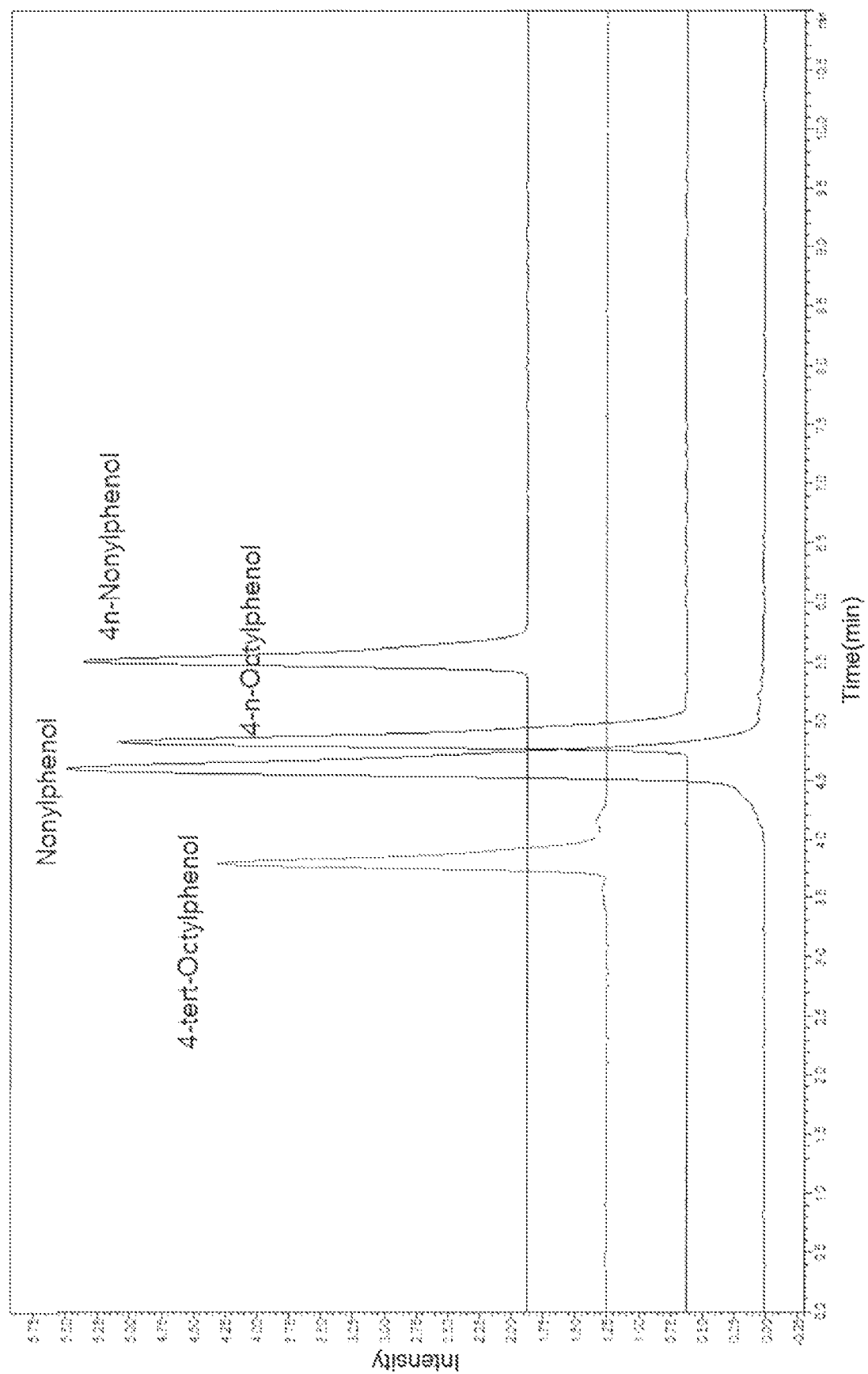
FIG. 22 is a measured example of an extracted ion chromatogram obtained by an analysis using the simultaneous analysis method for AP.
Figure 23:
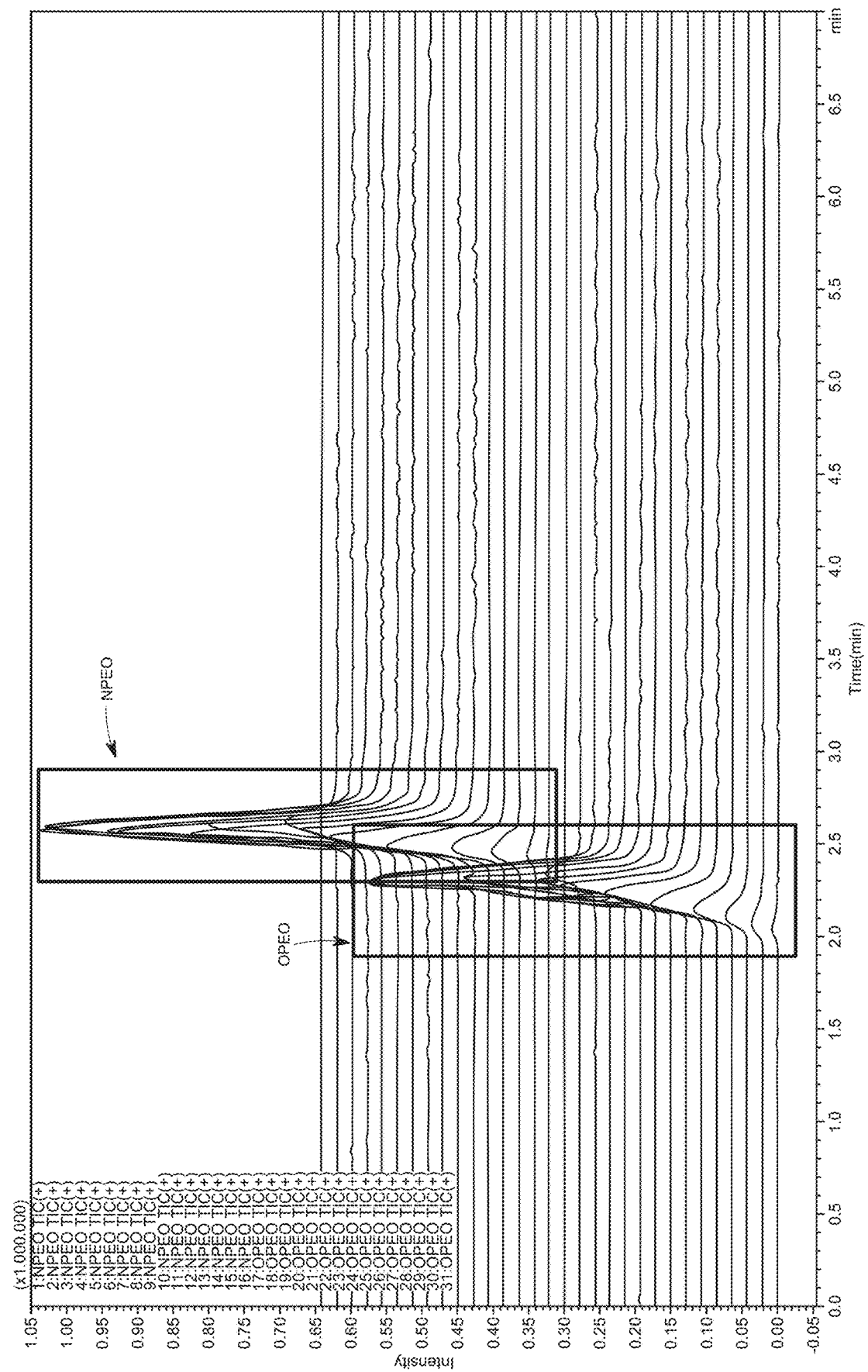
FIG. 23 is a measured example of an extracted ion chromatogram obtained by an analysis using the simultaneous analysis method for APEO.
Figure 24:
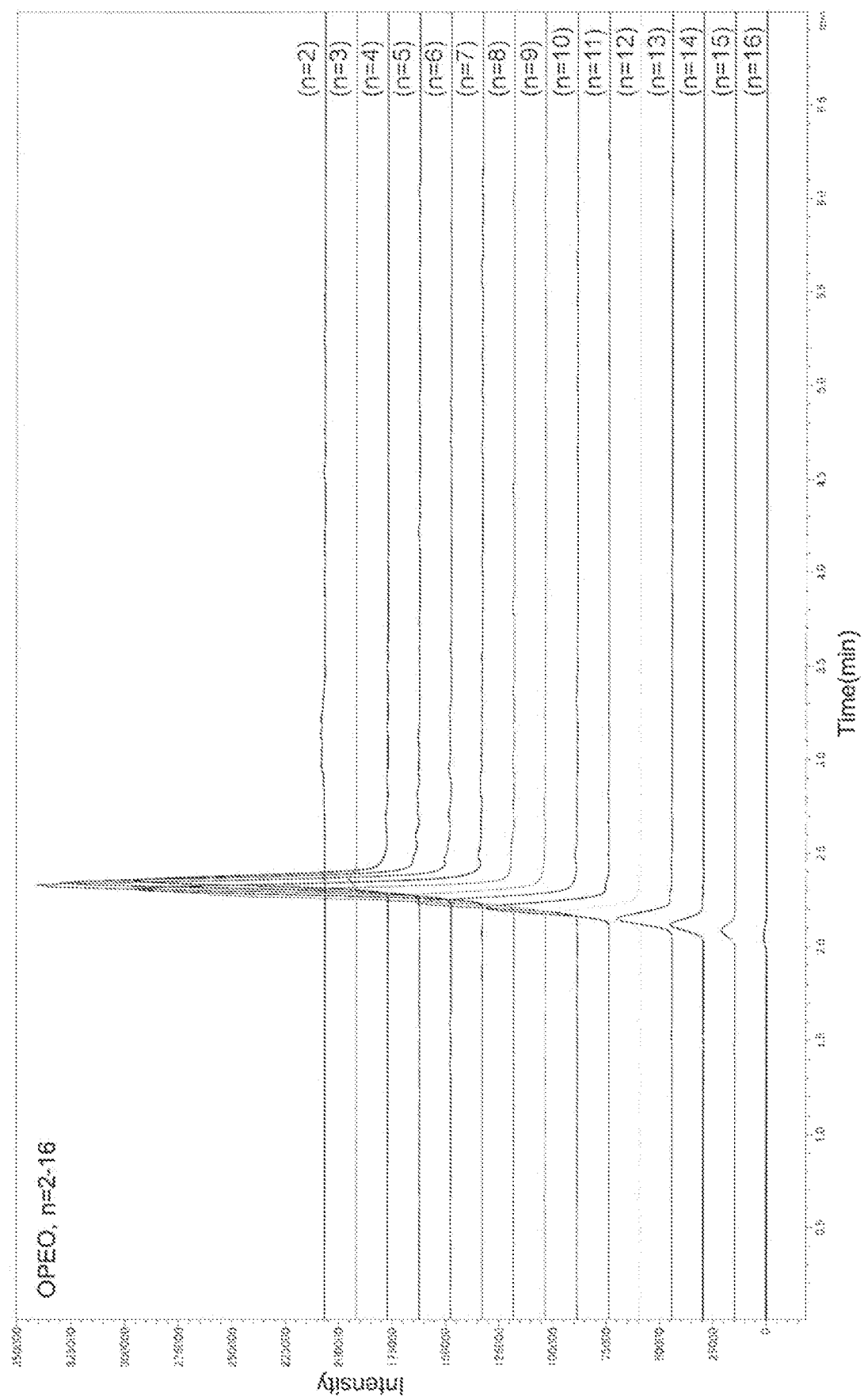
FIG. 24 is a measured example of an extracted ion chromatogram obtained by an analysis using the simultaneous analysis method for APEO.
Figure 25:
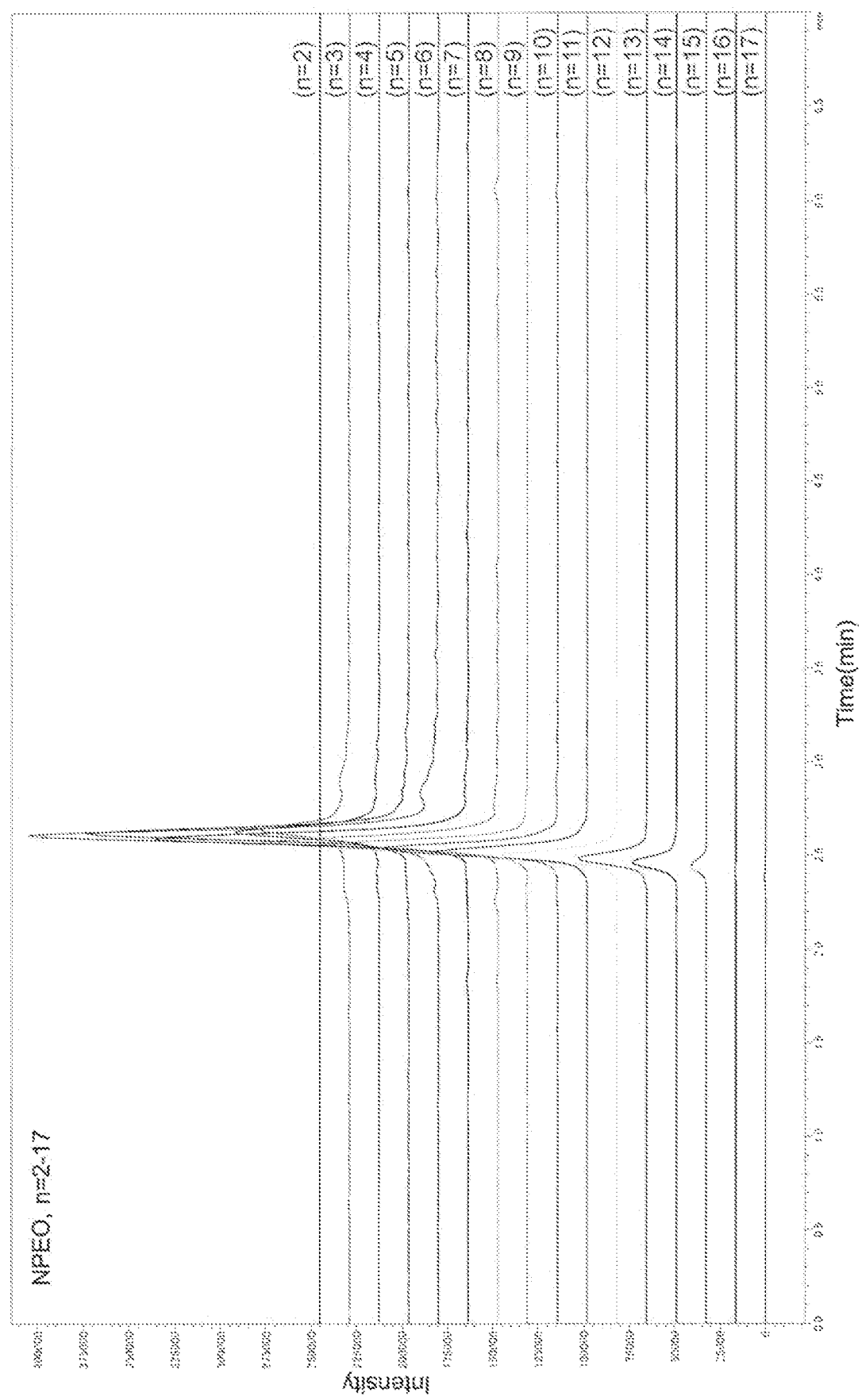
FIG. 25 is a measured example of an extracted ion chromatogram obtained by an analysis using the simultaneous analysis method for APEO.

FIG. 18 is a measured example of an extracted ion chromatogram obtained by an analysis using the simultaneous analysis method for specific aromatic amines. FIG. 19 is a measured example of an extracted ion chromatogram obtained by an analysis using the simultaneous analysis method for the first group of azo dyes. FIG. 20 is a measured example of an extracted ion chromatogram obtained by an analysis using the simultaneous analysis method for the second group of azo dyes. FIG. 21 is a measured example of an extracted ion chromatogram obtained by an analysis using the simultaneous analysis method for PFCs. FIG. 22 is a measured example of an extracted ion chromatogram obtained by an analysis using the simultaneous analysis method for AP. FIGS. 23-25 are a measured example of an extracted ion chromatogram obtained by an analysis using the simultaneous analysis method for APEO.

Although FIGS. 19-21 include no description of which substances correspond to the individual chromatogram curves, the correspondence between the chromatogram curves and the substances can be evidently understood from the retention time of each substance shown in FIGS. 11-14. In FIG. 20, analysis results obtained for a plurality of samples containing the same substance at different concentrations are superposed on each other, so that a plurality of chromatogram curves with different peak intensities are drawn at the same retention time.

Those chromatograms demonstrate that the substances specified as detection targets in each analysis method have been observed with satisfactorily high intensities. Although some peaks originating from different substances temporally overlap each other, they can be sufficiently separated from each other due to their difference in MRM transition. Therefore, the data processing unit 21 can calculate the area of the peak corresponding to the target substance on each chromatogram created in this manner, and determine a quantitative value (content value) from the peak area with reference to a calibration curve.

If an exhaustive test for the major hazardous substances in the fiber product needs to be performed, the operator repeats the task of selecting an analysis method to be executed as well as preparing the mobile phases and column corresponding to the selected analysis method. The test for the major hazardous substances in the fiber product can be completed by carrying out the analysis for all six analysis methods. As another example, if the test for the azo dyes only needs to be performed, the analysis needs to be carried out for only two analysis methods, i.e. the simultaneous analysis method for the first group of azo dyes and the simultaneous analysis method for the second group of azo dyes. If the result of a test obtained for a specific kind of hazardous substance is dubious, or if a test for a specific kind of hazardous substance needs to be performed, the operator can select the desired analysis method from among the six analysis methods and execute an analysis using that analysis method. In this manner, one or more analyses using one or more appropriate analysis methods can be executed according to the need or aim of the operator. The analysis time can thereby be shortened in the case of an exhaustive analysis as well as in the case of the test for a specific kind of hazardous substance.

It is preferable that the six kinds of analysis methods be prepared completely when the purpose of the analysis is to perform an exhaustive test for the major hazardous substances in fiber products. However, for example, it is not necessary to prepare the six kinds of analysis methods completely in the case where some of the hazardous substances (e.g. AP/APEO) should preferably be analyzed using a different technique or different type of analyzing device.

It is evident that the previously described embodiment is a mere example of the present invention and can be appropriately changed or modified within the spirit of the present invention.

REFERENCE SIGNS LIST

10 . . . Measurement Section
11 . . . Liquid Chromatograph (LC) Unit
12 . . . Triple Quadrupole Mass Spectrometer (MS/MS) Unit
20 . . . Personal Computer
21 . . . Data Processing Unit
22 . . . Control Unit
23 . . . LC Controller
24 . . . MS Controller
25 . . . Analysis Condition Setter
26 . . . Method Storage Section
27 . . . Input Unit
28 . . . Display Unit
100 . . . Basic Analysis-Control Program
110 . . . Analysis Condition Setting Program
200 . . . Method Package for Hazardous Substances in Fiber Products
210 . . . Simultaneous Analysis Method for Specific Aromatic Amines
220 . . . Simultaneous Analysis Method for the First Group of Azo Dyes
230 . . . Simultaneous Analysis Method for the Second Group of Azo Dyes
240 . . . Simultaneous Analysis Method for PFCs
250 . . . Simultaneous Analysis Method for AP
260 . . . Simultaneous Analysis Method for APEO

The invention claimed is:

1. A hazardous substance analyzing system for quantitatively analyzing hazardous substances contained in a sample by using an analyzing device, wherein:
a liquid chromatograph mass spectrometer is used as the analyzing device, the liquid chromatograph mass spectrometer including a liquid chromatograph for temporally separating substances contained in a sample to be analyzed and a tandem mass spectrometer for ionizing the substances in the sample temporally separated by the liquid chromatograph and detecting product ions generated by dissociating a specific kind of ion among ions produced by ionization; and
the hazardous substance analyzing system includes:
a) an information storage section in which control information for performing an analysis according to two or more measurement methods is stored, the control information including at least a gradient condition related to a plurality of mobile phases in the liquid chromatograph as well as a retention time and a multiple reaction monitoring (MRM) transition for detecting each substance in the tandem mass spectrometer, and the two or more measurement methods selected from following six measurement methods:
a1) a first measurement method for detecting, by a single analysis, a plurality of specific substances which are primary aromatic amines;
a2) a second measurement method for detecting, by a single analysis, a plurality of specific substances which are first azo compounds, under a condition that a first mobile phase is used as one of the mobile phases in the liquid chromatograph;
a3) a third measurement method for detecting, by a single analysis, a plurality of specific substances which are second azo compounds under a condition that a second mobile phase different from the first mobile phase is used as one of the mobile phases in the liquid chromatograph, the second azo compounds being different than the first azo compounds;
a4) a fourth analysis method for detecting, by a single analysis, a plurality of specific substances which are perfluorocompounds;
a5) a fifth analysis method for detecting, by a single analysis, a plurality of specific substances which are alkylphenol ethoxylates; and
a6) a sixth measurement method for detecting, by a single analysis, a plurality of specific substances which are alkylphenols;
b) a method selection assistant for displaying identifiers of the two or more measurement methods stored in the information storage section on a screen of a display unit and allowing a user to select one measurement method from the two or more measurement methods; and
c) an analysis controller for reading, from the information storage section, the control information for the measurement method selected by a user with the method selection assistant, and controlling an operation of the liquid chromatograph and an operation of the tandem mass spectrometer according to the read control information.

2. The hazardous substance analyzing system according to claim 1, wherein:
at least the control information concerning the second measurement method and the third measurement method is stored in the information storage section, and the method selection assistant is configured to allow a user to select one of the second and third measurement methods.

3. The hazardous substance analyzing system according to claim 2, wherein:
the control information concerning the first measurement method is also stored in the information storage section, and the method selection assistant is configured to allow a user to select one of the first, second and third measurement methods.

4. The hazardous substance analyzing system according to claim 3, wherein:
the hazardous substance analyzing system is configured to be used for an analysis of hazardous substances in a fiber product, the control information concerning all of the six measurement methods is stored in the information storage section, and the method selection assistant is configured to allow a user to select one of the six measurement methods.

5. The hazardous substance analyzing system according to claim 1, wherein:
the tandem mass spectrometer is a triple quadrupole mass spectrometer; and
the control information stored in the information storage section includes a collision energy corresponding to one or more MRM transitions specified for each substance.

6. A non-transitory computer-readable medium storing computer program to be installed in a computer used for controlling an operation of a liquid chromatograph mass spectrometer and processing data obtained by an analysis using the liquid chromatograph mass spectrometer, in order to quantitatively analyze hazardous substances in a sample, the liquid chromatograph mass spectrometer including a liquid chromatograph for temporally separating substances contained in a sample to be analyzed and a tandem mass spectrometer for ionizing the substances in the sample temporally separated by the liquid chromatograph and detecting product ions generated by dissociating a specific kind of ion among ions produced by ionization, the program including:
a) a method package in which control information for performing an analysis according to two or more measurement methods is included beforehand, the control information including at least a gradient condition related to a plurality of mobile phases in the liquid chromatograph as well as a retention time and a multiple reaction monitoring (MRM) transition for detecting each substance in the tandem mass spectrometer, the two or more measurement methods selected from the following six measurement methods:
a1) a first measurement method for detecting, by a single analysis, a plurality of specific substances which are primary aromatic amines;
a2) a second measurement method for detecting, by a single analysis, a plurality of specific substances which are first azo compounds, under the condition that a first mobile phase is used as one of the mobile phases in the liquid chromatograph;
a3) a third measurement method for detecting, by a single analysis, a plurality of specific substances which are second azo compounds under the condition that a second mobile phase different from the first mobile phase is used as one of the mobile phases in the liquid chromatograph, the second azo compounds being different than the first azo compounds;
a4) a fourth analysis method for detecting, by a single analysis, a plurality of specific substances which are perfluorocompounds;
a5) a fifth analysis method for detecting, by a single analysis, a plurality of specific substances which are alkylphenol ethoxylates; and
a6) a sixth measurement method for detecting, by a single analysis, a plurality of specific substances which are alkylphenols;
wherein the program is configured to make the computer perform the steps of:
displaying identifiers of the two or more measurement methods included in the method package on a screen of a display unit,
allowing a user to select one measurement method from the two or more measurement methods,
obtaining, from the method package, the control information for the measurement method selected by a user with the method selection assistant functional section, and
controlling an operation of the liquid chromatograph and an operation of the tandem mass spectrometer according to the obtained control information.

* * * * *